United States Patent
Ohta et al.

(10) Patent No.: US 9,379,974 B2
(45) Date of Patent: Jun. 28, 2016

(54) TRANSFER CONTROL DEVICE, INTEGRATED CIRCUIT THEREOF, TRANSFER CONTROL METHOD, AND TRANSFER CONTROL SYSTEM

(75) Inventors: Yuusaku Ohta, Osaka (JP); Shinichiro Nishioka, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 127 days.

(21) Appl. No.: 13/984,928

(22) PCT Filed: Jan. 27, 2012

(86) PCT No.: PCT/JP2012/000515
§ 371 (c)(1),
(2), (4) Date: Aug. 12, 2013

(87) PCT Pub. No.: WO2012/132180
PCT Pub. Date: Oct. 4, 2012

(65) Prior Publication Data
US 2013/0315250 A1   Nov. 28, 2013

(30) Foreign Application Priority Data
Mar. 29, 2011   (JP) ................. 2011-072949

(51) Int. Cl.
*H04L 12/741* (2013.01)
*H04L 12/46* (2006.01)
*H04L 12/64* (2006.01)
*H04L 29/12* (2006.01)

(52) U.S. Cl.
CPC ............ *H04L 45/74* (2013.01); *H04L 12/4625* (2013.01); *H04L 12/6418* (2013.01); *H04L 61/2038* (2013.01)

(58) Field of Classification Search
None
See application file for complete search history.

(56) References Cited

U.S. PATENT DOCUMENTS 8,296,837 B2 * 10/2012 Manville ........... H04L 29/06027
726/11
2003/0161332 A1    8/2003 Ohno et al.
(Continued)

FOREIGN PATENT DOCUMENTS

CN    101795300 A    8/2010
JP    2004-7287      1/2004
(Continued)

OTHER PUBLICATIONS

International Search Report issued Mar. 13, 2012 in corresponding International Application No. PCT/JP2012/000515.
Office Action issued Jun. 30, 2015 in corresponding Chinese Application No. 201280008549.4 with partial English translation.
Extended European Search Report issued Apr. 21, 2015 in corresponding European Application No. 12765429.1.

*Primary Examiner* — Gregory Sefcheck
*Assistant Examiner* — Rina Pancholi
(74) *Attorney, Agent, or Firm* — Wenderoth, Lind & Ponack, L.L.P.

(57) ABSTRACT

To achieve efficient data transfer between a first network and a second network, and, in particular, to reduce processing load pertaining to address conversion, a transfer control device in the first network acquires an address of a transfer target device in the second network, and assigns the acquired address to a transfer device in the first network. When data transmitted through the first network is to be transferred to the transfer target device via the transfer device, there is no need to perform address conversion as the transfer device and the transfer target device are assigned the same address.

25 Claims, 19 Drawing Sheets

(56) References Cited

U.S. PATENT DOCUMENTS

| | | | |
|---|---|---|---|
| 2003/0172257 A1* | 9/2003 | Greenblat et al. | 712/234 |
| 2003/0189940 A1 | 10/2003 | Greenblat | |
| 2004/0255047 A1* | 12/2004 | Larson et al. | 709/249 |
| 2007/0079366 A1* | 4/2007 | Geffner | H04L 63/02 726/12 |
| 2009/0222542 A1* | 9/2009 | Miyajima | 709/222 |
| 2010/0169717 A1* | 7/2010 | Sonoda et al. | 714/48 |
| 2011/0016227 A1* | 1/2011 | Feng | H04W 40/248 709/245 |

FOREIGN PATENT DOCUMENTS

| | | |
|---|---|---|
| JP | 2004-129028 | 4/2004 |
| JP | 2009-10606 | 1/2009 |
| JP | 2010-118864 | 5/2010 |
| WO | 2007/072254 | 6/2007 |

* cited by examiner

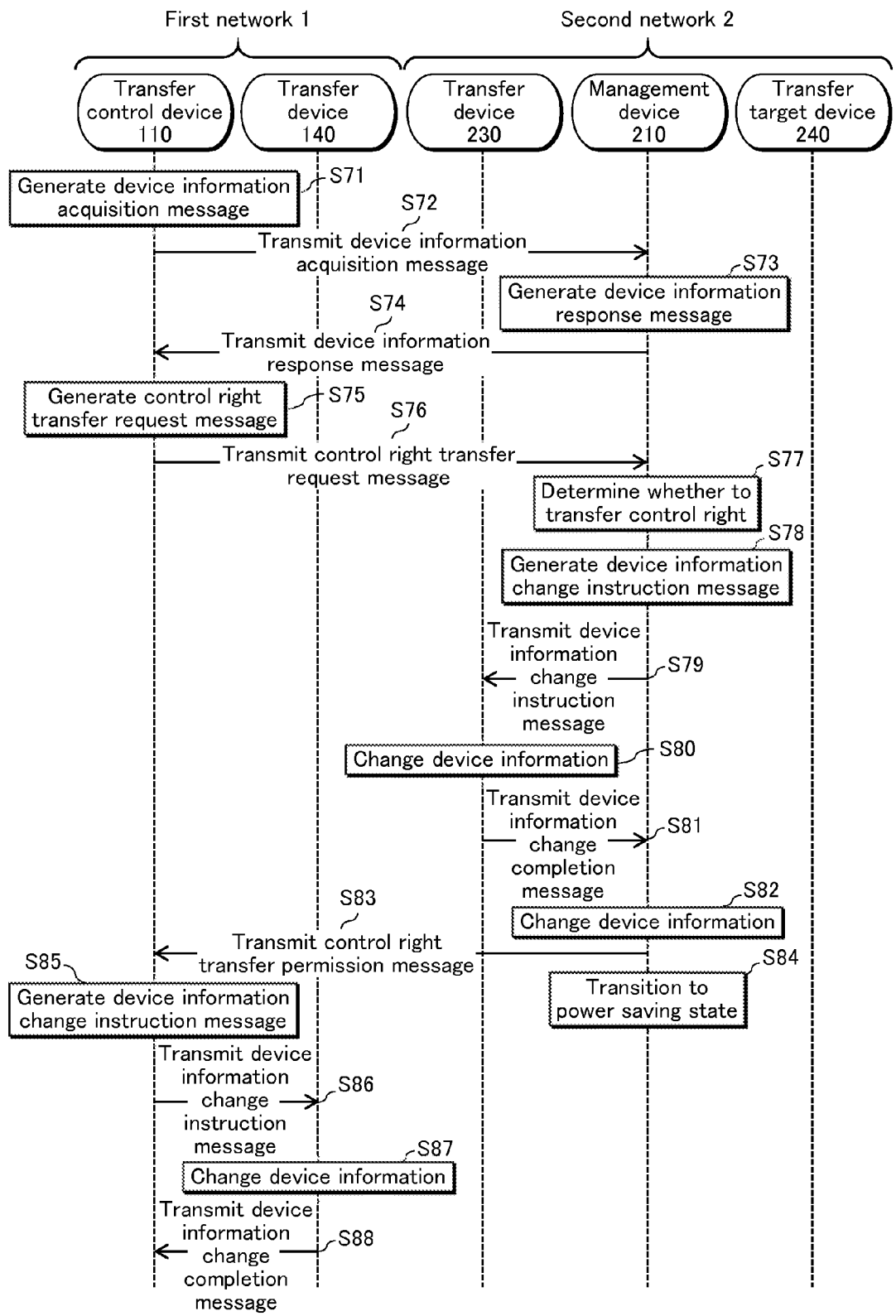

FIG.19A

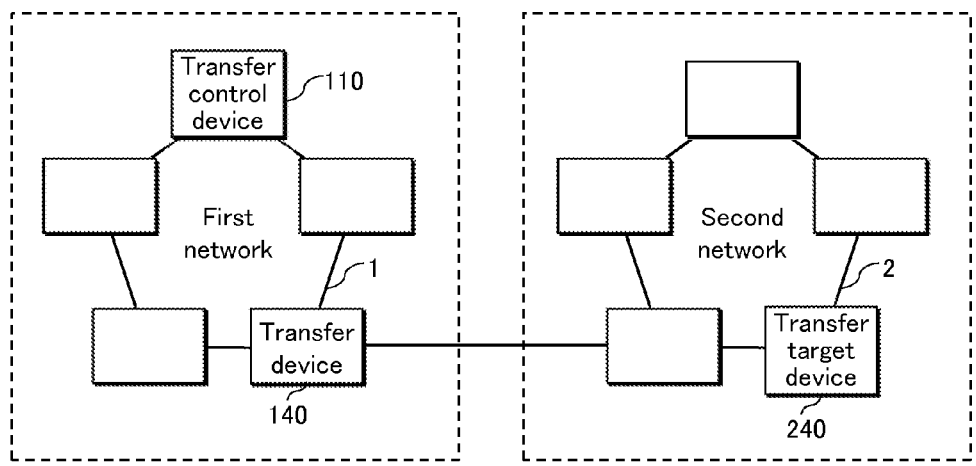

FIG.19B

Device information on each device

| First network | | Second network | |
|---|---|---|---|
| Device | Device address | Device | Device address |
| Transfer control device | 1 | | |
| Transfer device | 7 | Transfer target device | 8 |

Device information on each device (during transfer)

| First network | | Second network | |
|---|---|---|---|
| Device | Device address | Device | Device address |
| Transfer control device | 1 | | |
| Transfer device | 8 | Transfer target device | 8 |

Transmission information on data transmitted
from transfer control device to transfer target device

| First network | | Second network | |
|---|---|---|---|
| Source address | Destination address | Source address | Destination address |
| 1 | 8 | 1 | 8 |

TRANSFER CONTROL DEVICE, INTEGRATED CIRCUIT THEREOF, TRANSFER CONTROL METHOD, AND TRANSFER CONTROL SYSTEM

TECHNICAL FIELD

The present invention relates to a transfer control device, an integrated circuit thereof, a transfer control method, and a transfer control system for achieving efficient data transfer between networks.

BACKGROUND ART

In recent years, application software for transferring digital data, such as private photos/videos and broadcast/distributed contents, to other devices is becoming popular.

In the use of such application software for achieving transfer, the time required for transfer is preferably as short as possible in terms of usability. To this end, data transfer technology for enabling reduction of a system processing load is necessary. In particular, in order to achieve high-speed data transfer between devices belonging to different networks, technology for enabling efficient and low-load transfer between networks is necessary.

As an example of a conventional transfer control method pertaining to transfer between networks, a tunnel connection system is disclosed (see Patent Literature 1).

In Patent Literature 1, data packet transfer between devices belonging to different networks is performed with a low load. To this end, in Patent Literature 1, addresses are assigned to devices so that the first network and the second network are in the same subnet, and data transfer is performed without performing address conversion of a data packet even when a payload portion includes an address.

As another example, a communication system is disclosed (see Patent Literature 2).

In Patent Literature 2, a frame is transmitted between devices belonging to different network segments through a repeater. To accomplish this, in Patent Literature 2, a source device transmits a frame that includes the first header indicating the repeater as a destination and the second header addressed to a destination device, and the repeater rewrites the first header based on the second header.

CITATION LIST

Patent Literature

Patent Literature 1
Japanese Patent Application Publication No. 2009-10606
Patent Literature 2
Japanese Patent Application Publication No. 2010-118864

SUMMARY OF INVENTION

In technology disclosed in Patent Literature 1, however, two networks are assigned the same network prefix, so that the two networks share a single finite address space. Since an address being used in one of the networks cannot be used in the other network, a part of the address space cannot be used in each network, leading to a decrease in space efficiency. This technology is particularly unsuitable for a network with a small number of assignable addresses.

Furthermore, technology disclosed in Patent Literature 1 assumes a star topology having the tunnel connection device as its hub, and therefore is not applicable to other physical topologies such as a ring topology.

On the other hand, in technology disclosed in Patent Literature 2, the source device of data transmission is required to append not only the first header but also the second header for each frame, and the repeater is also required to rewrite the first header based on the second header for each frame. As a result, in technology disclosed in Patent Literature 2, processing pertaining to addresses, such as appending of two headers by the source device and rewriting of a header by the repeater, is required to be performed for each frame, leading to an increase in system load and a decrease in processing efficiency.

The present invention has been conceived in view of the above-mentioned problems, and aims to suppress a decrease in address space efficiency and to avoid processing to rewrite an address within a header, which is associated with data transfer, between networks configured to have respective physical topologies.

A transfer control device pertaining to the present invention is a transfer control device included in a communication system for transferring data via a transfer device in a first network to a transfer target device in a second network, the first and second networks having address spaces independent of each other, the transfer control device including: a device information acquisition unit configured to acquire device information on the transfer target device, the device information on the transfer target device including an address of the transfer target device on the second network; and a device information assignment unit configured to change an address of the transfer device by assigning the transfer device an address identical to the address of the transfer target device.

According to the above-mentioned structure, since the address of the transfer device is changed so as to be identical to the address of the transfer target device, the transfer device does not have to rewrite an address included in a header of each packet to perform data transfer. With this structure, the transfer device can reduce system processing load pertaining to data transfer between networks. Furthermore, when the data is transferred to the second network via the transfer device, the data is addressed to the transfer device, and an address of a device in the second network other than the transfer target device cannot directly be designated. Therefore, even when the address of the device in the second network other than the transfer target device is identical to an address of any device in the first network, operation of the first network is not affected. The present invention thus can suppress a decrease in address space efficiency.

In the transfer control device pertaining to the present invention, when changing the address of the transfer device, the device information assignment unit may reset addresses of all devices in the first network other than the transfer control device so that each of the reset addresses is unique on the first network.

According to the above-mentioned structure, when the address of the transfer device is changed, the address of each device in the first network other than the transfer control device and the transfer device is also changed. With this structure, the overlap of addresses can be avoided regardless of addresses of devices in the first network before being changed.

In the transfer control device pertaining to the present invention, when acquiring the device information on the transfer target device, the device information acquisition unit may receive, from the second network, device information on each device in the second network.

According to the above-mentioned structure, the transfer control device only has to acquire the device information on the transfer target device from any device in the second network. This can eliminate the need for the transfer control device to ask individual devices in the second network for their addresses, leading to improvement in processing efficiency.

In the transfer control device pertaining to the present invention, the device information on each device in the second network may include a device type indicating a function of the device in the second network.

According to the above-mentioned structure, the transfer control device can know the device type of each device in the second network in association with a device number thereof, and thus can surely know whether or not the transfer target device is a device of a desired device type.

In the transfer control device pertaining to the present invention, the device information acquisition unit may ask the second network for the address of the transfer target device by designating a device type of the transfer target device.

According to the above-mentioned structure, the transfer control device can acquire the address of the transfer target device by designating the desired device type. Since unnecessary addresses are not transmitted between networks, data traffic can be reduced.

In the transfer control device pertaining to the present invention, when a device of the designated device type is not included in the second network, the device information acquisition unit may be notified accordingly.

According to the above-mentioned structure, the transfer control device can surely know whether or not the transfer target device of the desired device type exists in the second network by the notification from the second network.

The transfer control device pertaining to the present invention may further include a power control instruction unit configured to instruct the second network to transition to a power saving state after the second network responds to the device information acquisition unit.

According to the above-mentioned structure, since the transfer control device instructs the second network to transition to the power saving state, power consumption can be reduced.

In the transfer control device pertaining to the present invention, the power control instruction unit may instruct the second network to cancel the power saving state when data transfer between the first and second networks terminates.

According to the above-mentioned structure, the second network can be restored from the power saving state to a normal state upon termination of a transfer period between the first and second networks.

In the transfer control device pertaining to the present invention, the transfer device may perform transfer to the second network when a destination device address included in a header of a packet received after the address of the transfer device is changed by the device information assignment unit is identical to the address of the transfer device.

According to the above-mentioned structure, since the transfer control device can set a destination address for each data piece, data can be transmitted to each device in the first network other than the transfer target device even during data transfer between networks.

In the transfer control device pertaining to the present invention may further include a transmission information generation unit configured to add transfer determination information to a header of a packet to be transmitted to the transfer target device, the transfer determination information indicating whether the packet is to be transferred to the second network or not, wherein the transfer device may perform transfer to the second network when a destination device address included in a header of a packet received after the address of the transfer device is changed by the device information assignment unit is identical to the address of the transfer device, and the transfer determination information indicates that the packet is to be transferred to the second network.

According to the above-mentioned structure, the transfer control device can provide setting, for each data piece, as to whether the data piece is to be transferred between networks. The transfer control device thus can designate, for each data piece, an address of the transfer device in the first network as a final destination address or as an address of the transfer device to transfer the data piece to the second network.

In the transfer control device pertaining to the present invention may further include a device information change request unit configured to transmit, to the second network, a message requesting a change of an address of a transfer device in the second network to an address identical to an address of the transfer control device as a source device of data transfer.

According to the above-mentioned structure, regarding data transmission from the transfer target device to the source device, since the transfer device in the second network only has to transfer all data pieces to the first network, and does not require determination of the transfer instruction, efficient transfer can be achieved.

In the transfer control device pertaining to the present invention may further include a transfer termination instruction generation unit configured to generate a transfer termination instruction to be transmitted to the second network to terminate data transfer between the first and second networks.

According to the above-mentioned structure, the transfer control device can terminate the transfer period between the first and second networks in an explicit manner.

In the transfer control device pertaining to the present invention, the transfer termination instruction may be a 1-bit flag.

According to the above-mentioned structure, the transfer control device can easily recognize termination of the transfer period between the first and second networks by making a determination on information in a 1-bit field provided for each data piece.

In the transfer control device pertaining to the present invention, the transfer termination instruction may be a message.

According to the above-mentioned structure, the transfer control device does not have to provide a field for transfer termination instruction for each data piece, leading to improvement in data transfer efficiency.

In the transfer control device pertaining to the present invention, the data may be transferred from a given device in the first network to the transfer target device.

According to the above-mentioned structure, the transfer target device is accessible from each device in the first network other than the transfer control device. For example, a device that transmits data to the transfer target device can designate the transfer target device as well as the transfer device as a destination device by designating the transfer target device as a destination device of data transmission. As a result, the data is transferred to the transfer target device via the transfer device.

In the transfer control device pertaining to the present invention, the first network may have a ring topology.

According to the above-mentioned structure, the present invention is applicable to a system having a ring topology.

In the transfer control device pertaining to the present invention, the first network may have a daisy chain topology.

According to the above-mentioned structure, the present invention is applicable to a system having a daisy chain topology.

In the transfer control device pertaining to the present invention, the transfer device in the first network may be a wireless communication device.

According to the above-mentioned structure, the transfer control device can connect the first and second networks by wireless communication, leading to greater flexibility of arrangement of the first and second networks.

In the transfer control device pertaining to the present invention, the transfer target device may be a communication device.

According to the above-mentioned structure, the transfer control device can control, as the transfer target device, the communication device in the second network as if it is connected to the first network.

In the transfer control device pertaining to the present invention, the transfer device in the first network and the transfer target device may use different communication methods.

According to the above-mentioned structure, the transfer control device controls, as the transfer target device, the communication device in the second network via the transfer device in the first network. With this structure, the transfer control device can access a communication network that uses communication technology different from that is used to connect the first and second networks.

In the transfer control device pertaining to the present invention, the transfer target device may be a recording medium.

According to the above-mentioned structure, the transfer control device can achieve efficient data transfer to the recording medium in the second network.

The present invention may be an integrated circuit for controlling a communication system for transferring data via a transfer device in a first network to a transfer target device in a second network, the first and second networks having address spaces independent of each other, the integrated circuit including: a device information acquisition unit configured to acquire device information on the transfer target device, the device information on the transfer target device including an address of the transfer target device on the second network; and a device information assignment unit configured to change an address of the transfer device by assigning the transfer device an address identical to the address of the transfer target device.

According to the above-mentioned structure, the present invention can be implemented by using an integrated circuit, such as an LSI, as the transfer control device.

The present invention may be a transfer control method for controlling a communication system for transferring data via a transfer device in a first network to a transfer target device in a second network, the first and second networks having address spaces independent of each other, the transfer control method including: acquiring device information on the transfer target device, the device information on the transfer target device including an address of the transfer target device on the second network; and changing an address of the transfer device by assigning the transfer device an address identical to the address of the transfer target device.

According to the above-mentioned structure, the present invention can be implemented by a software program and the like.

The present invention may be a transfer control system including a transfer control device for transferring data via a transfer device in a first network to a transfer target device in a second network, the transfer device having a function to transfer data addressed to the transfer device from the first network to the second network, the first and second networks having address spaces independent of each other, wherein the transfer control device includes: a device information acquisition unit configured to acquire device information on the transfer target device, the device information on the transfer target device including an address of the transfer target device on the second network; and a device information assignment unit configured to change an address of the transfer device by assigning the transfer device an address identical to the address of the transfer target device, and a given device in the first network transmits the data to the transfer target device by using the address of the transfer target device, the transfer device receives data addressed to the transfer target device, and transfers the received data to the second network, and the transfer target device receives the data transferred by the transfer device.

According to the above-mentioned structure, the present invention can be implemented as a system.

The present invention can suppress a decrease in address space efficiency and avoid processing to rewrite an address within a header, which is associated with data transfer, between networks configured to have respective physical topologies.

BRIEF DESCRIPTION OF DRAWINGS

FIG. 13 is a Gantt chart illustrating an inter-network transfer mode setup operation pertaining to Embodiment 2.

FIGS. 19A and 19B are conceptual diagrams illustrating an operation of the entire system including the transfer control device pertaining to Embodiments 1 and 2.

DETAILED DESCRIPTION OF INVENTION

The following describes embodiments of the present invention in detail with reference to the drawings. Note that, in the present description and drawings, components having the same function are provided with the same reference signs, and description thereof is not repeated.

Embodiment 1

<Structure>

(1) Structure of Entire System

Figure 1:
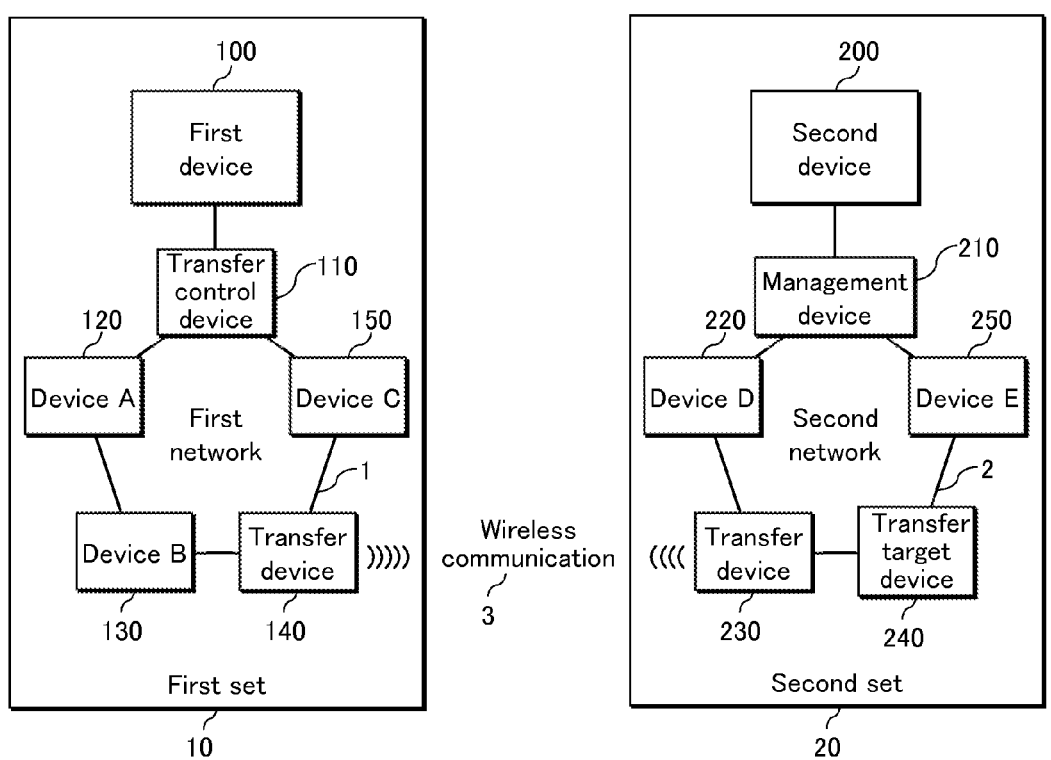
FIG. 1 is an overall view of a system including a transfer control device pertaining to Embodiments 1 and 2.

FIG. 1 is a block diagram illustrating the structure of an entire system including a transfer control device pertaining to Embodiment 1. Devices illustrated in FIG. 1 include, for example, a communication module, a control module, and a storage device within an apparatus, and form networks by being connected to buses. One set represents one apparatus.

A first set 10 is implemented for example by a BD (Blu-ray Disc) recorder, and a first device 100 and a transfer control device 110 are implemented as part of an integrated circuit. The first device 100 is a circuit included in the first set 10, and is indirectly connected to a first network 1 via the transfer control device. A transfer device 140 is a wireless communication device, and is implemented for example as a WiGig (Wireless Gigabit) module having an SDIO interface. The first network 1 has a ring topology, and includes, as a host node, the transfer control device 110, and, as device nodes, a device A 120, a device B 130, the transfer device 140, and a device C 150.

A second set 20 is implemented for example by a smart phone, and a second device 200 and a management device 210 are implemented as part of an integrated circuit. The second device 200 is a circuit included in the second set 20, and is indirectly connected to a second network 2 via the management device. A transfer device 230 is a wireless communication device, and is implemented for example as a WiGig module having an SDIO interface. The second network 2 has a ring topology, and includes, as a host node, the management device 210, and, as device nodes, a device D 220, the transfer device 230, a transfer target device 240, and a device E 250.

The first network 1 and the second network 2 operate with the same protocol at the data link layer of the OSI reference model. Devices in each network are assigned addresses so that each of the addresses is unique in the network. Details of the definition of the addresses are described later. In addition to the addresses, the transfer devices 140 and 230, which are both communication devices, are assigned IP addresses.

The first network 1 and the second network 2 are connected to each other by wireless communication 3 performed between the transfer devices 140 and 230.

(2) Transfer Control Device 110

Figure 2:
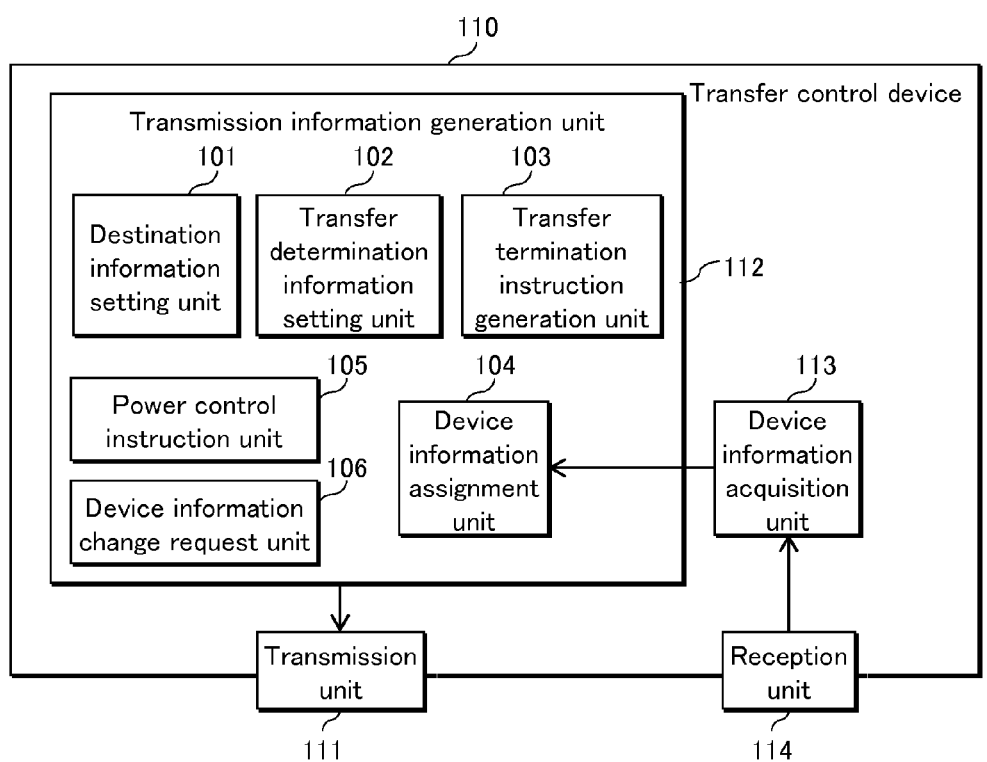
FIG. 2 is a block diagram of the transfer control device pertaining to Embodiments 1 and 2.

FIG. 2 is a block diagram showing the details of the transfer control device 110.

The transfer control device 110 pertaining to Embodiment 1 is implemented for example as part of an integrated circuit so as to include an SD host controller.

The transfer control device 110 pertaining to Embodiment 1 includes a transmission unit 111, a transmission information generation unit 112, a device information acquisition unit 113, and a reception unit 114.

The transmission information generation unit 112 includes a destination information setting unit 101, a transfer determination information setting unit 102, a transfer termination instruction generation unit 103, a device information assignment unit 104, a power control instruction unit 105, and a device information change request unit 106.

Since the first network 1 pertaining to Embodiment 1 has a ring topology, the transmission unit 111 is connected to a reception unit included in an adjacent device. In Embodiment 1, the transmission unit 111 is connected to a reception unit included in the device A 120. Similarly, the reception unit 114 is connected to a transmission unit included in the device C 150.

The transmission information generation unit 112 generates transmission information on each device included in the first network 1 and in the second network 2. A detailed format of the information is described later.

The destination information setting unit 101 sets an address of a destination device for each transmission information piece. Each device included in the first network 1 and in the second network 2 processes received information as information addressed to itself, when a destination device address included in the received information is identical to its own address. On the other hand, each device included in the first network 1 and in the second network 2 transfers the received information to an adjacent device via a transmission unit included therein as information not addressed to itself, when the destination device address included in the received information is not identical to its own address.

The transfer determination information setting unit 102 sets, for each transmission information piece, transfer determination information indicating whether or not the transmission information piece is to be transmitted to the second network 2. For example, the transfer determination information setting unit 102 defines the transfer determination information such that data is to be transferred to the second network 2 when the transfer determination information is "1", and data is not to be transferred to the second network 2 when the transfer determination information is "0". A device that receives data transfers the received data to the second network 2 only when the destination information is identical to its own address, and the transfer determination information is set to "1". Otherwise, the device does not transfer the received data to the second network 2.

The transfer termination instruction generation unit 103 generates a message for notifying the second network 2 of termination of an information transfer period between the first network 1 and the second network 2.

The device information assignment unit 104 assigns an address to each device in the first network 1. An operation to assign addresses is performed during initialization immediately after power on or reset, or at the beginning of the information transfer period between the first network 1 and the second network 2.

The power control instruction unit 105 instructs the management device 210 included in the second network 2 to transition to a power saving mode. The power control instruction unit 105 causes the management device 210 to cancel the power saving mode to be restored to a normal power mode by causing the transfer device 230 to transmit an interrupt to the management device 210. Details of this operation are described later.

The device information change request unit 106 requests the management device 210 included in the second network 2 to change an address of each device in the second network 2. An operation to request a change of addresses is performed at the beginning or at the end of the information transfer period between the first network 1 and the second network 2.

The device information acquisition unit 113 transmits, to the management device 210 included in the second network 2, a request for an address of each device in the second network 2, and acquires the address of each device in the second network 2 from the management device 210. At the beginning of the information transfer period between the first network 1 and the second network 2, the device information assignment unit 104 changes an address of the transfer device 140 by assigning the transfer device 140 an address identical to the acquired address of the transfer target device 240. Details of this operation are described later.

(3) Management Device 210

Figure 3:
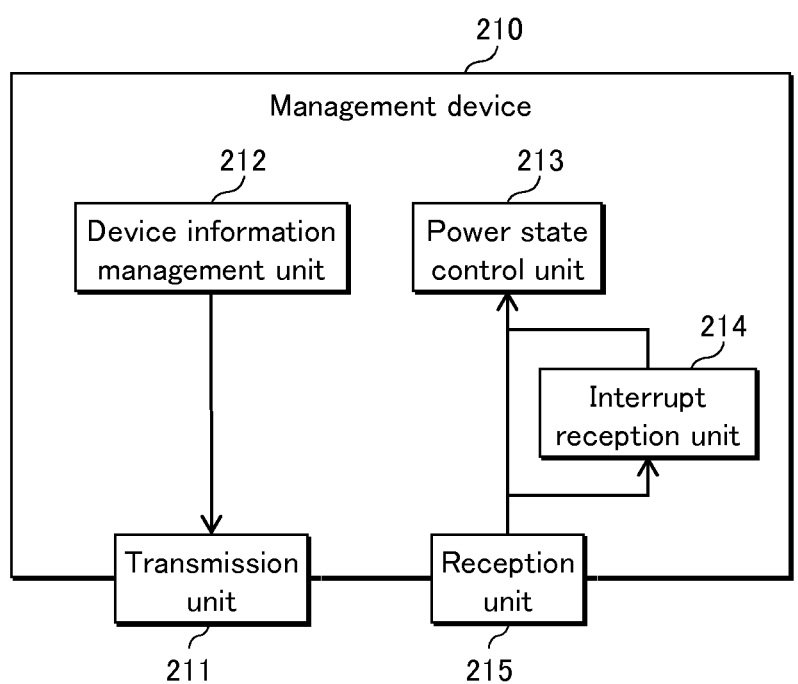
FIG. 3 is a block diagram of a management device pertaining to Embodiments 1 and 2.

FIG. 3 is a block diagram showing the details of the management device 210.

The management device 210 pertaining to Embodiment 1 is implemented for example as part of an integrated circuit so as to include an SD host controller.

The management device 210 includes a transmission unit 211, a device information management unit 212, a power state control unit 213, an interrupt reception unit 214, and a reception unit 215.

The device information management unit 212 manages an address of each device included in the second network.

In response to the request for the device information on each device in the second network 2, the transmission unit 211 transmits the address of each device managed by the device information management unit 212.

The power state control unit 213 causes the management device 210 to transition from the normal power mode to the power saving mode, or from the power saving mode to the normal power mode when a predetermined condition is met. In Embodiment 1, upon receiving a power saving mode transition instruction from the power control instruction unit 105 included in a management right transfer instruction message, the power state control unit 213 causes the management device 210 to transition to the power saving mode, and, upon receiving an interrupt from the transfer device 230 included in the second network, the power state control unit 213 causes the management device 210 to transition to the normal power mode.

The interrupt reception unit 214 receives an interrupt from a device in the second network other than the management device 210 via the reception unit 215.

The reception unit 215 receives data transmitted from each device in the first network 1 and in the second network 2 to the management device 210.

In the power saving mode, the management device 210 has functions to transmit, from the transmission unit 211, data that is received by the reception unit 215 and is not addressed to the management device, and to receive an interrupt via the reception unit 215. In the power saving mode, however, the transmission unit 211 does not perform an operation to respond to the request for the device information transmitted from the transfer control device 210. The device information management unit 212 only holds addresses managed therein.

(4) Transfer Device 230

Figure 4:
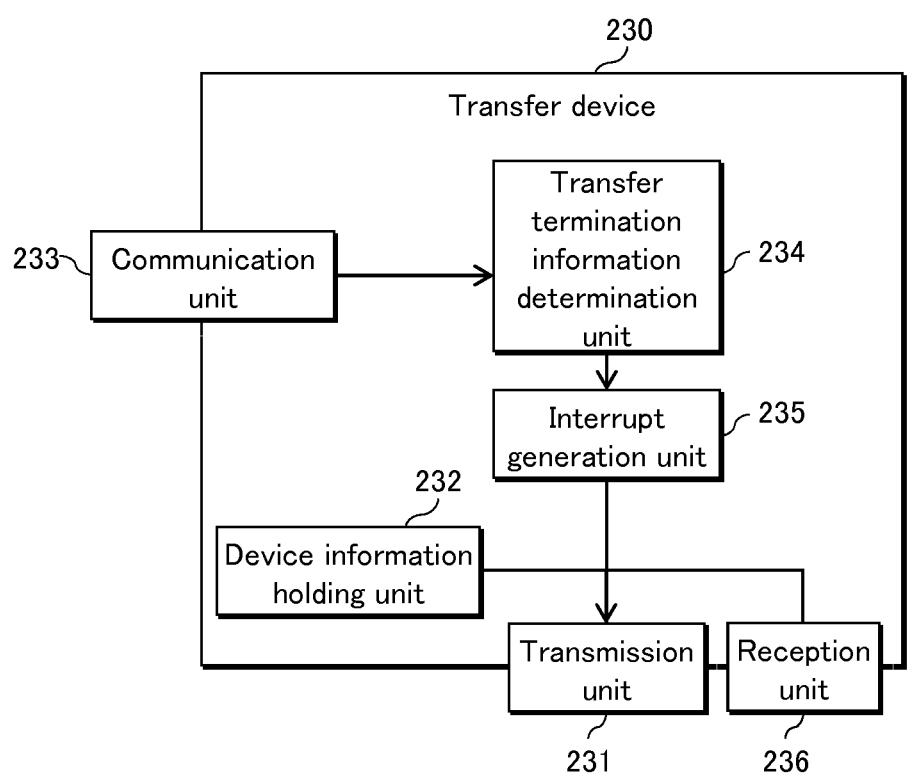
FIG. 4 is a block diagram of a transfer device pertaining to Embodiments 1 and 2.

FIG. 4 is a block diagram showing the details of the transfer device 230.

The transfer device 230 pertaining to Embodiment 1 is for example a wireless communication device, and is implemented for example as a WiGig module having an SDIO interface.

The transfer device 230 includes a transmission unit 231, a device information holding unit 232, a communication unit 233, a transfer termination information determination unit 234, an interrupt generation unit 235, and a reception unit 236.

The transmission unit 231 transmits, into the second network 2, an address and a device type held by the device information holding unit 232, data received by the communication unit 233, interrupt signals generated by the interrupt generation unit 235, and the like.

The device information holding unit 232 holds an address and a device type of the transfer device 230.

The communication unit 233 performs communication with the first network 1.

The transfer termination information determination unit 234 determines whether or not data received by the communication unit 233 includes information indicating termination of the transfer period between the first network 1 and the second network 2.

When the information indicating termination of the transfer period between the first network 1 and the second network 2 is included, the interrupt generation unit 235 generates an interrupt to notify the management device 210 accordingly. When the communication unit 233 receives data, the interrupt generation unit 235 also generates an interrupt to notify the management device 210 accordingly.

The reception unit 236 receives data transmitted from other devices in the second network 2. The reception unit 236 passes information addressed to itself to the communication unit 233, and transfers data other than the information addressed to itself to another device via the transmission unit 231.

(5) Transfer Target Device 240

Figure 5:
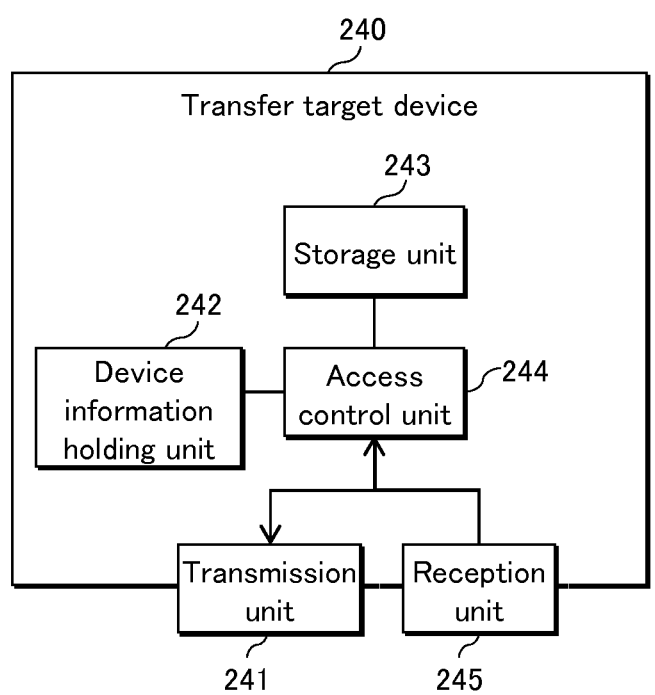
FIG. 5 is a block diagram of a transfer target device pertaining to Embodiments 1 and 2.

FIG. 5 is a block diagram showing the details of the transfer target device 240.

The transfer target device 240 pertaining to Embodiment 1 is implemented for example as flash memory having an interface connectable to the management device 210.

The transfer target device 240 includes a transmission unit 241, a device information holding unit 242, a storage unit 243, an access control unit 244, and a reception unit 245.

The transmission unit 241 transmits an address held by the device information holding unit 242 and various information pieces stored in the storage unit 243 to other devices included in the second network 2. The transmission unit 241 also transmits a message in response to a control command issued to the transfer target device 240.

The device information holding unit 242 holds an address of the transfer target device 240. The storage unit 243 is nonvolatile memory to/from which various information pieces are written/read.

The access control unit 244 performs control over accesses for writing, reading, and deletion with respect to the storage unit 243. The access control unit 244 also generates a message in response to a control command issued to the transfer target device 240.

The reception unit 245 receives data transmitted from other devices in the second network 2. The reception unit 244 passes data addressed to itself to the access control unit 244, and transfers data other than the data addressed to itself to another device via the transmission unit 241.

(6) Device Information 300

Figure 6:
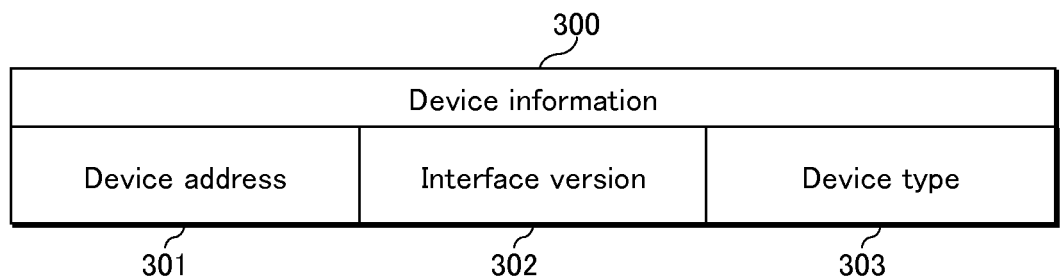
FIG. 6 defines a format of device information pertaining to Embodiments 1 and 2.

FIG. 6 shows a specific format of device information 300.

The device information 300 includes a device address 301, an interface version 302, and a device type 303.

The device address 301 is an address set so as to be unique to each device in a network, and is set for example as numerical information of four bits. In Embodiment 1, an address of each device in the first network 1 and an address of each device in the second network 2 are respectively set by the transfer control device 110 and the management device 210. Since the device address 301 has to be unique only within each network, the first network 1 and the second network 2 may share the same device address. For example, the device address 301 of the device A 120 in the first network 1 may have the same value as the device address 301 of the device D 220 in the second network 2.

The interface version 302 is information indicating a version supported by a network interface of each device, and is expressed for example as numerical information of three bits. The value of the interface version 302 is set in advance in a manufacturing process of each device, and can be changed due to software updates in the device.

The device type 303 indicates a major function of each device, and is expressed for example as information of five bits. The major function of each device is for example a communication function of the transfer device 140 and a storage function of the transfer target device 240, which are each expressed as a predetermined bit sequence. In particular, as for the communication function, in addition to a normal communication mode, an unconditional transfer mode and a conditional transfer mode can be set. In the unconditional transfer mode, data received from the reception unit included in each device is unconditionally transferred to the communication unit. In the conditional transfer mode, the received data is transferred when the transfer determination information for the received data is valid. Such information on the device type enables the transfer control device 110 and the management device 210 to determine and manage a function of each device included in a corresponding network. The transfer control device 110 and the management device 210 can also set and manage an inter-network communication mode.

(7) Transmission Information 400

Figure 7:
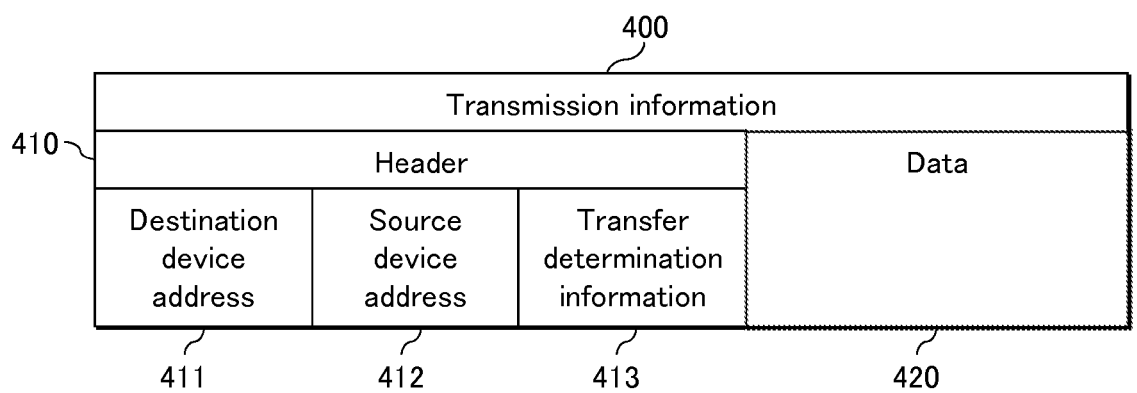
FIG. 7 defines a format of transmission information pertaining to Embodiments 1 and 2.

FIG. 7 shows a specific format of transmission information 400.

The transmission information 400 includes a header 410 and data 420.

The header 410 includes a destination device address 411, a source device address 412, and transfer determination information 413.

As the destination device address 411, an address of a device to which the transmission information 400 is to be transmitted is set.

As the source device address 412, an address of a device generating the transmission information 400 is set.

The transfer determination information 413 is expressed for example as 1-bit information. The transfer determination information 413 is set to "1" when the transmission information 400 is transferred by the transfer device to another network, and is set to "0" when the transmission information 400 is not transferred by the transfer device to the other device.

Examples of the data are a command to control the destination device, data to be written to the destination device, data generated within the source device, data read from the source device.

<Operations>

The following describes a series of operations relating to message transmission/reception between the transfer control device 110 and the transfer target device 240 pertaining to Embodiment 1 of the present invention, based on the above-mentioned configuration.

(1) Setup of Inter-network Transfer Mode

Figure 8:
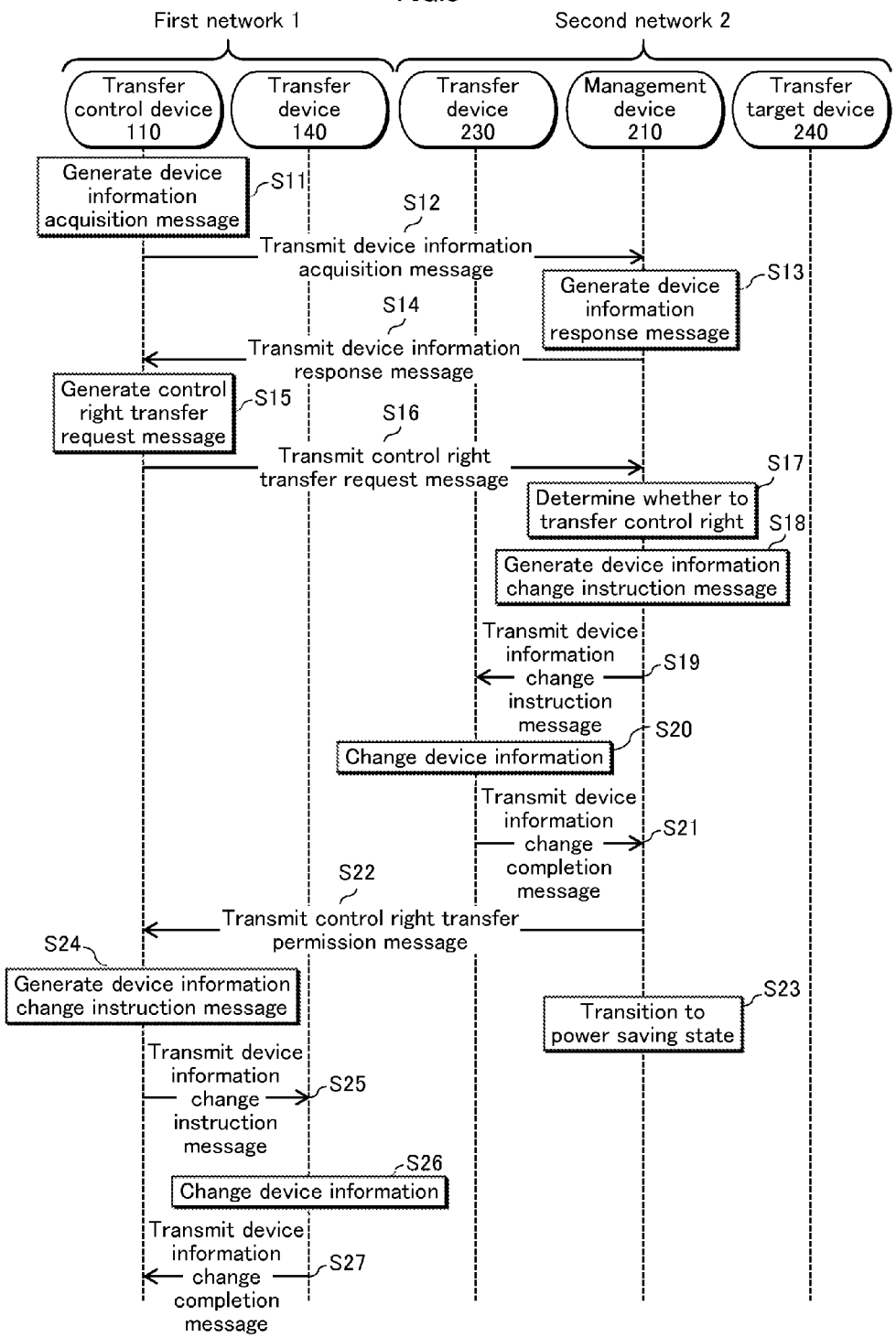
FIG. 8 is a Gantt chart illustrating an inter-network transfer mode setup operation pertaining to Embodiment 1.
Figure 12A:
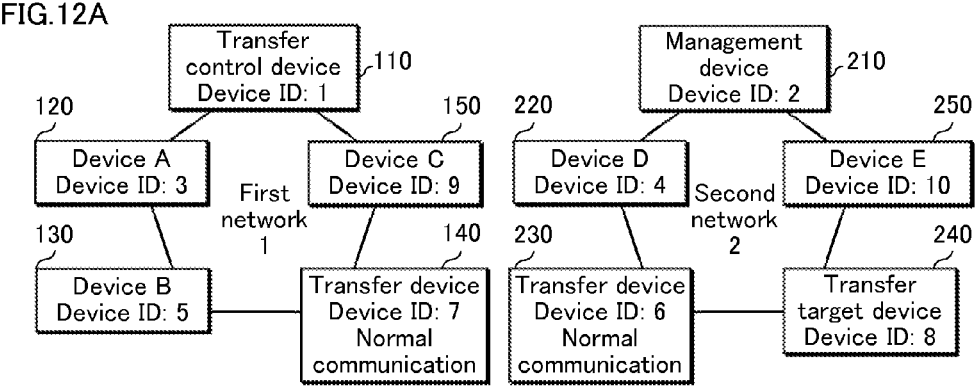
FIGS. 12A, 12B, 12C, and 12D are each an overall view showing a status of an address of each device pertaining to Embodiment 1.

FIG. 8 shows an inter-network transfer mode setup operation pertaining to Embodiment 1. FIG. 12A shows an address of each device before inter-network transfer mode setup. The following describes the inter-network transfer mode setup operation pertaining to Embodiment 1, based on FIGS. 8, 12A, 12B, 12C, and 12D.

In order to acquire device information on each device in the second network 2, the transfer control device 110 generates a device information acquisition message as an IP packet (S11), and transmits it to the management device 210 (S12).

Upon receiving the device information acquisition message, the management device 210 generates, as an IP packet, a device information response message for notifying the transfer control device 110 of the device information on each device in the second network 2 (S13), and transmits it to the transfer control device 110 (S14).

The transfer control device 110 acquires the device information on each device in the second network 2. The transfer control device 110 generates, as an IP packet, a control right transfer request message for transferring, from the management device 210 to the transfer control device 110, a control right to manage and change device information as successfully acquired (S15). The transfer control device 110 transmits the generated IP packet including the control right transfer request message to the management device 210 (S16). The control right transfer request message includes a request for use of the transfer device 230 as a repeater for transfer between the first network 1 and the second network 2. The control right transfer request message further includes a request for setting an address of the transfer device 230 (=6) to an address having the same value as an address of the transfer control device (=1). The control right transfer request message further includes a request for transition of the management device 210 to a power saving state. The control right transfer request message further includes a request for setting of the communication mode of the transfer device 230 to the unconditional transfer mode.

Upon receiving the control right transfer request message, the management device 210 determines whether the right to control the second network may be transferred to the transfer control device 110 or not (S17). When determining that the control right may be transferred, the management device 210 generates a message for changing the device information on the transfer device 230 according to the control right transfer request message (S18). The management device 210 transmits the generated message to the transfer device 230 (S19). The generated message includes an instruction to change the device information on the transfer device 230 (device address=6, communication mode: normal communication mode) according to the control right transfer request message. Specifically, the management device 210 changes the device information on the transfer device 230 (device address=6, communication mode: normal communication mode) to device information (device address=1, communication mode: unconditional transfer mode) according to the control right transfer request message.

A case where the control right may not be transferred includes a case where any device in the second network 2 is performing some kind of transaction.

Figure 12B:
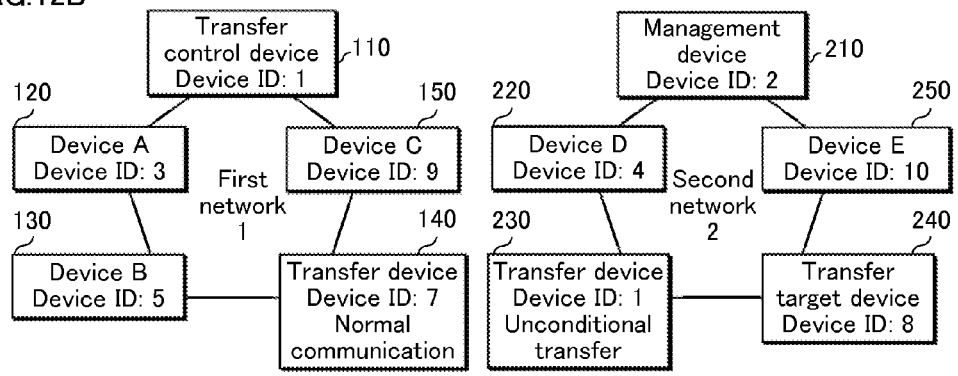

Upon receiving the message for changing the device information, the transfer device 230 changes its own device information according to the contents of the received message (S20 and FIG. 12B). Upon completing the change, the transfer device 230 transmits a device information change completion message to the management device 210 (S21).

Upon receiving the device information change completion message, the management device 210 transmits a control right transfer permission message to the transfer control device 110 (S22), and transitions to the power saving state according to the request for transition to the power saving state (S23).

Upon successfully receiving the control right transfer permission message, the transfer control device 110 sets an address of the transfer device 140 (=7) to an address having the same value as an address of the transfer target device 240 (=8). The transfer control device 110 further generates the device information change instruction message for setting the communication mode of the transfer device 140 to the conditional transfer mode (S24), and transmits the generated message to the transfer device 140 (S25).

Figure 12C:
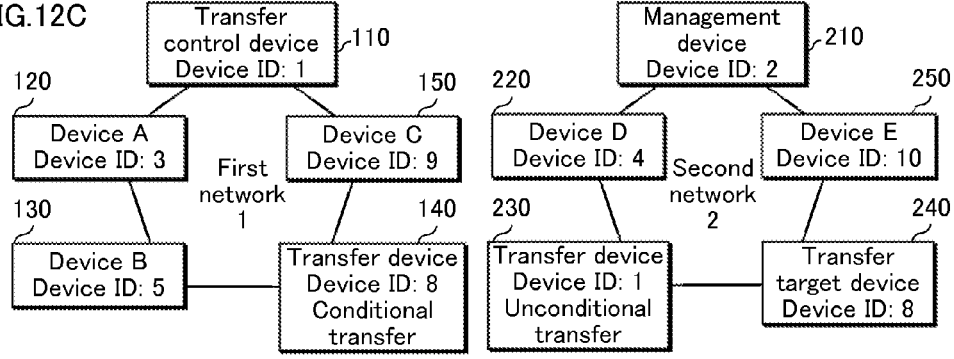

Upon receiving the device information change instruction message, the transfer device 140 changes its own address from "7" to "8" and changes its own communication mode to the conditional transfer mode, according to the contents of the received message (S26 and FIG. 12C). Upon completing the change, the transfer device 140 notifies the transfer control device 110 accordingly by transmitting the device information change completion message to the transfer control device 110 (S27).

(2) Message Transmission from Transfer Control Device 110 to Transfer Target Device 240

Figure 9:
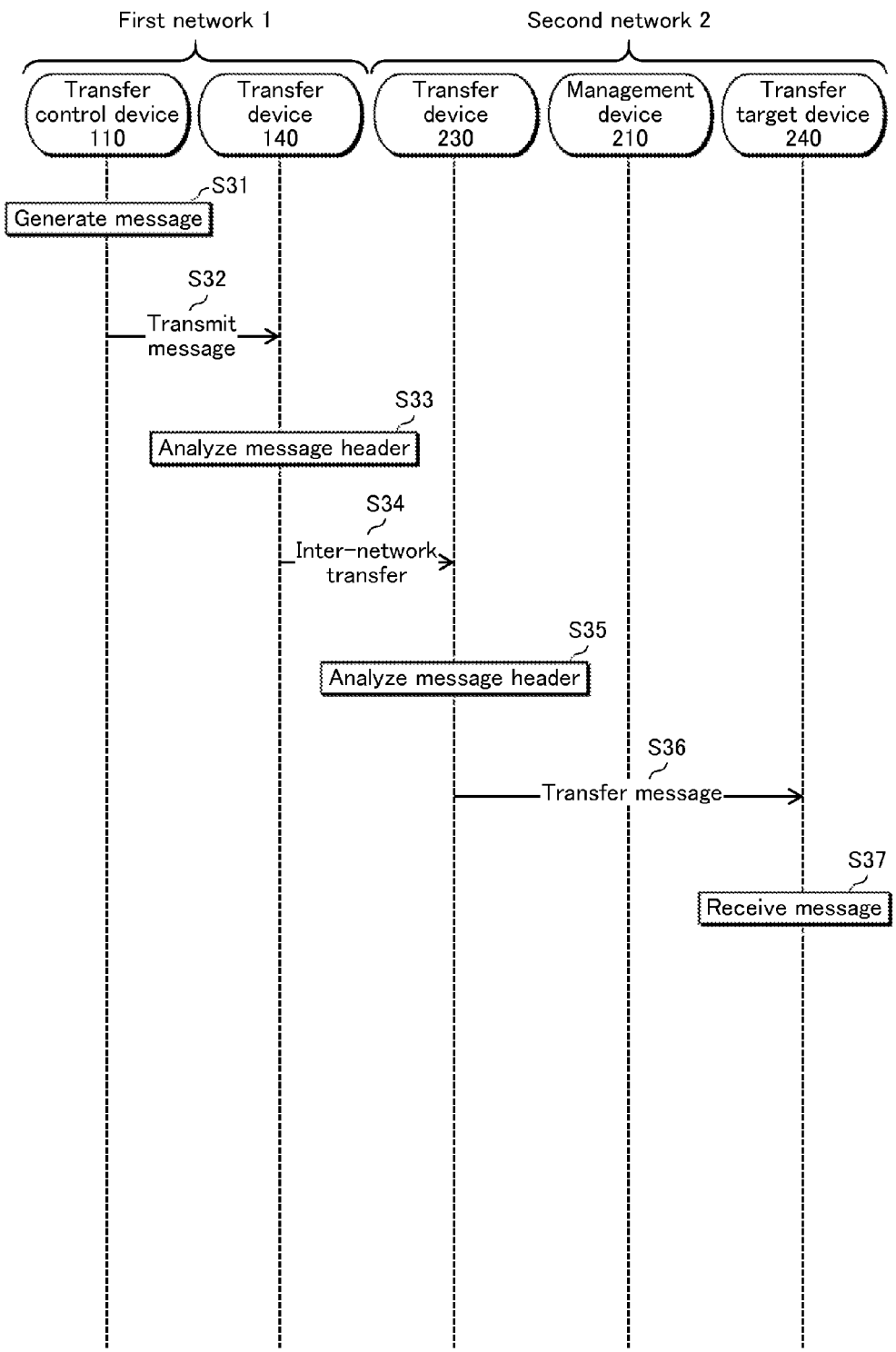
FIG. 9 is a Gantt chart illustrating a transmission operation from the transfer control device to the transfer target device pertaining to Embodiments 1 and 2.

FIG. 9 illustrates an operation to transmit a message from the transfer control device 110 to the transfer target device 240 pertaining to Embodiment 1. The following describes the operation to transmit a message from the transfer control device 110 to the transfer target device 240 pertaining to Embodiment 1, based on FIG. 9.

The transfer control device 110 sets the destination device address to the address of the transfer target device 240 (=8), and sets the source device address to its own address (=1). The transfer control device 110 further generates a given message such as a data packet in which the transfer determination information is set to be valid (S31), and transmits the generated message to the transfer device 140 (S32).

Upon receiving the message, the transfer device 140 analyzes a header of the received message (S33), and recognizes that the received message is a message addressed to itself as the destination device address (=8) is identical to its own address (=8). Upon recognizing that the received message is the message addressed to itself, the transfer device 140 analyzes the transfer determination information as its own communication mode is set to the conditional transfer mode. Since the transfer determination information is valid, the transfer device 140 transfers the message to the second network (S34).

The transfer device 230 analyzes a header of the received message (S35). Since the destination device address (=8) is not identical to its own address (=6), the transfer device 230 transfers the received message to the transfer target device (S36).

The transfer target device 240 recognizes that the received message is a message addressed to itself as the destination device address of the received message (=8) is identical to its own address (=8), and processes the received message (S37). The transfer target device 240 ignores the contents of the transfer determination information as the transfer target device 240 does not have a communication function.

(3) Message Transmission from Transfer Target Device 240 to Transfer Control Device 110

Figure 10:
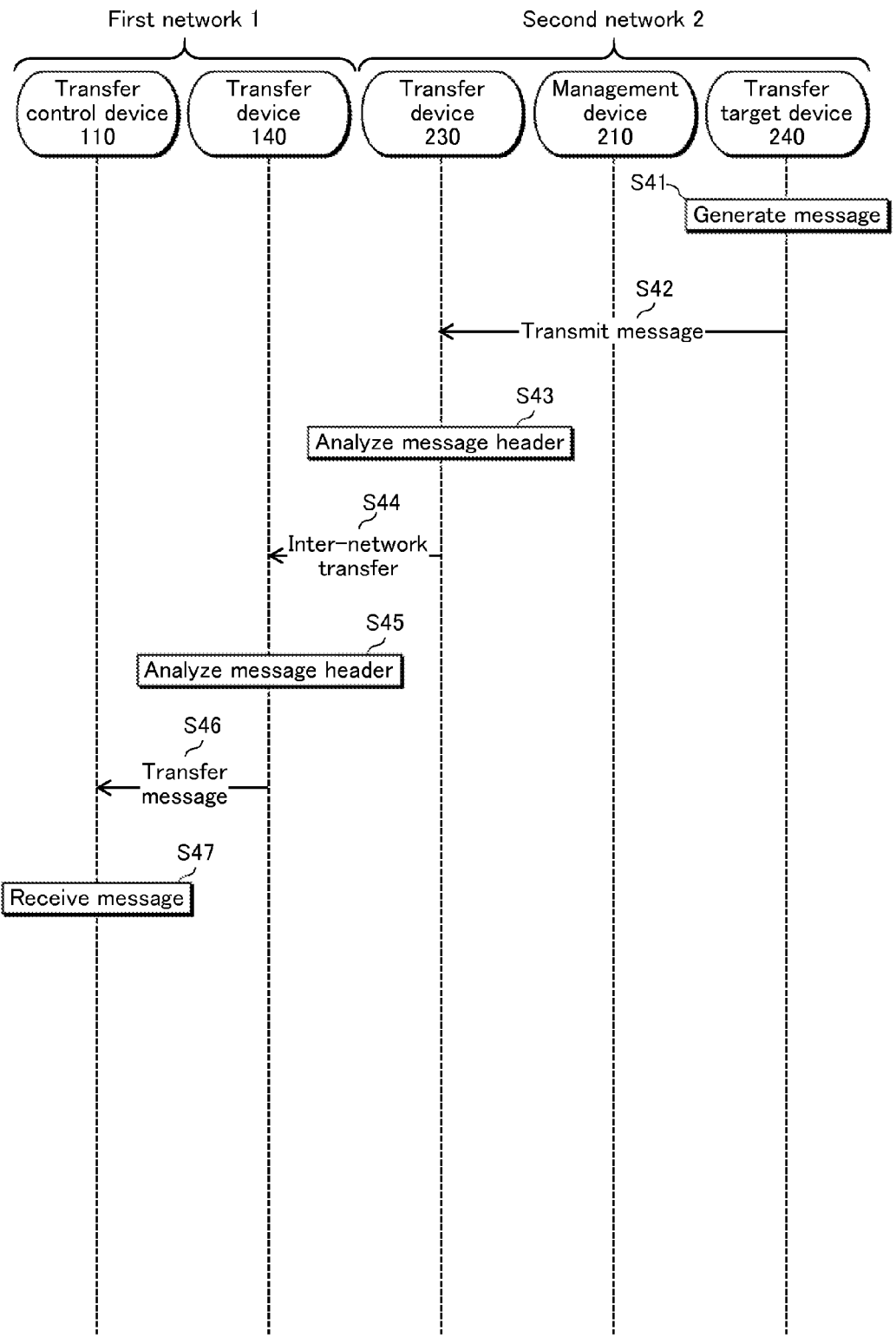
FIG. 10 is a Gantt chart illustrating a transmission operation from the transfer target device to the transfer control device pertaining to Embodiments 1 and 2.

FIG. 10 illustrates an operation to transmit a message from the transfer target device 240 to the transfer control device 110 pertaining to Embodiment 1. The following describes the operation to transmit a message from the transfer target device 240 to the transfer control device 110 pertaining to Embodiment 1, based on FIG. 10.

The transfer target device 240 generates a given message such as a data packet in which the destination device address is set to the address of the transfer control device 110 (=1), and the source device address is set to its own address (=8) (S41). The transfer target device 240 transmits the generated message to the transfer device 230 (S42).

Upon receiving the message, the transfer device 230 analyzes a header of the received message (S43), and recognizes that the received message is a message addressed to itself as the destination device address (=1) is identical to its own address (=1). Upon recognizing that the received message is the message addressed to itself, the transfer device 230 transfers the received message to the first network as its own communication mode is set to the unconditional transfer mode (S44).

The transfer device 140 analyzes a header of the received message (S45). Since the destination device address (=1) is not identical to its own address (=8), the transfer device 140 transfers the received message to the transfer control device (S46).

The transfer control device 110 recognizes that the received message is a message addressed to itself as the destination device address of the received message (=1) is identical to its own address (=1), and processes the received message (S47).

(4) Termination of Inter-network Transfer Mode

Figure 11:
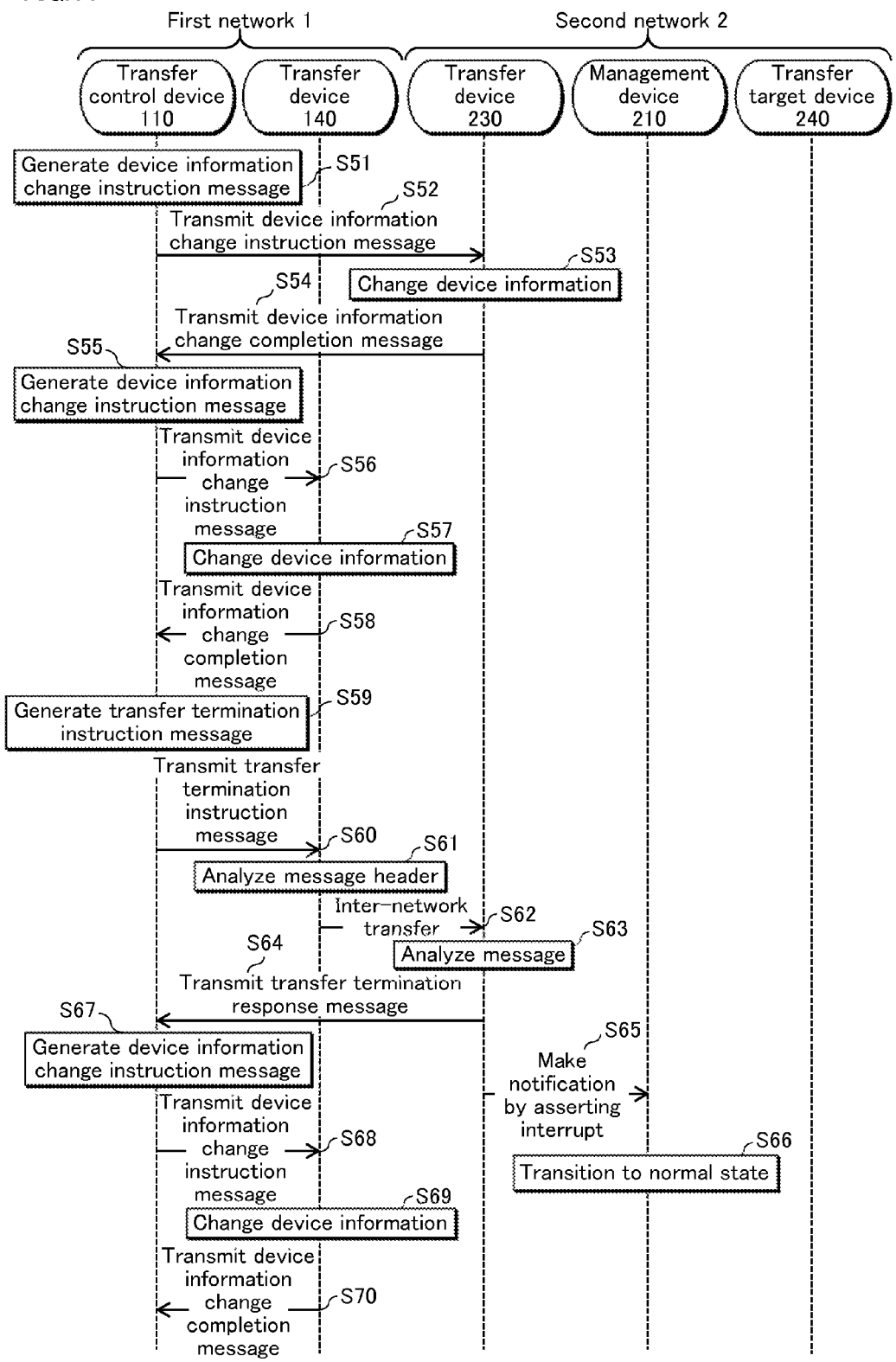
FIG. 11 is a Gantt chart illustrating an inter-network transfer mode termination operation pertaining to Embodiment 1.

FIG. 11 shows an inter-network transfer mode termination operation pertaining to Embodiment 1. The following describes the inter-network transfer mode termination operation pertaining to Embodiment 1, based on FIG. 11.

In order to restore the device information on the transfer device 230 to a state before the start of the inter-network transfer mode (device address=6, normal communication mode), the transfer control device 110 generates the device information change instruction message as an IP packet (S51). The transfer control device 110 transmits the generated IP packet including the device information change instruction message to the transfer device 230 (S52).

Upon receiving the device information change instruction message, the transfer device 230 changes its own address from "1" to "6" and changes the communication mode to the normal communication mode, according to the contents of the received message (S53). Upon completing the change, the transfer device 230 notifies the transfer control device 110 accordingly by transmitting the device information change completion message to the transfer control device 110 (S54).

Upon receiving the device information change completion message, the transfer control device 110 generates the device information change instruction message for setting the address of the transfer device 140 to an address identical to the address of the transfer device 230 (S55). The transfer control device 110 transmits the generated device information change instruction message to the transfer device 140 (S56).

Figure 12D:
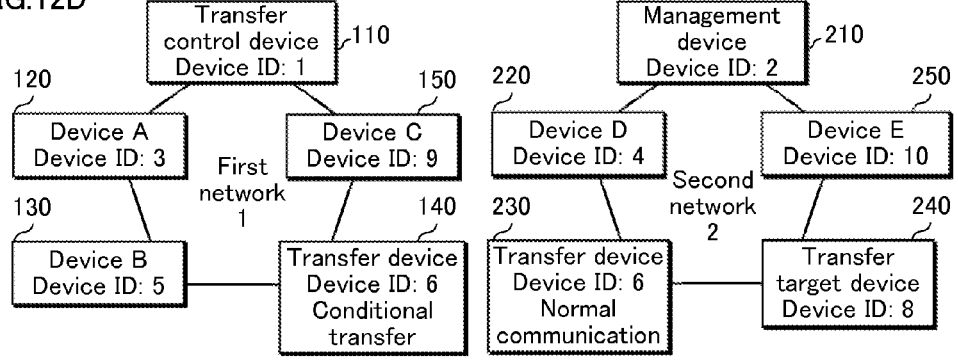

Upon receiving the device information change instruction message, the transfer device 140 changes its own address from "8" to "6" according to the contents of the received message (S57 and FIG. 12D). Upon completing the change, the transfer device 140 notifies the transfer control device 110 accordingly by transmitting the device information change completion message to the transfer control device 110 (S58).

Through the series of operations as described above, a device as a target of transfer is changed from the transfer target device 240 to the transfer device 230.

Upon receiving the device information change completion message, the transfer control device 110 generates a transfer termination instruction message to notify the second network of termination of the inter-network transfer mode (S59). The transfer termination instruction message includes a request for transition of the management device 210 to a normal power state. The transfer control device 110 transmits the generated transfer termination instruction message to the transfer device 140 (S60).

Upon receiving the message, the transfer device 140 analyzes a header of the received message (S61), and recognizes that the received message is a message addressed to itself as the destination device address (=6) is identical to its own address (=6). Upon recognizing that the received message is the message addressed to itself, the transfer device 140 then analyzes the transfer determination information. Since the transfer determination information is valid, the transfer device 140 transfers the received message to the second network (S62). The communication mode of the transfer device 140 is set to the conditional transfer mode.

Upon receiving the message, the transfer device 230 analyzes a header of the received message, and recognizes that the received message is a message addressed to itself as the destination device address (=6) is identical to its own address (=6). The transfer device 230 then analyzes the contents of the received message (S63), and recognizes that the received message is the transfer period termination instruction message. The transfer device 230 transmits a transfer termination response message to the transfer control device 110 to notify the transfer control device 110 that the contents of the received message are successfully analyzed (S64).

Upon transmitting the transfer termination response message, the transfer device 230 asserts an interrupt to the management device 210 to notify the management device 210 of termination of the transfer period (S65).

Upon receiving the interrupt, the management device 210 checks the contents of the interrupt, and transitions from the power saving state to the normal state (S66).

In order to restore the device information on the transfer device 140 to the state before the start of the inter-network transfer mode (device address=7, normal communication mode), the transfer control device 110 generates the device information change instruction message (S67). The transfer control device 110 transmits the generated device information change instruction message to the transfer device 140 (S68).

Upon receiving the device information change instruction message, the transfer device 140 changes its own address from "6" to "7" and changes its own communication mode to the normal communication mode, according to the contents of the received message (S69). Upon completing the change, the transfer device 140 notifies the transfer control device 110 accordingly by transmitting the device information change completion message to the transfer control device 110 (S70).

Through the series of operations as described above, the first network 1 and the second network 2 are restored to the state before the start of the inter-network transfer mode (FIG. 12A).

Embodiment 2

Figure 15A:
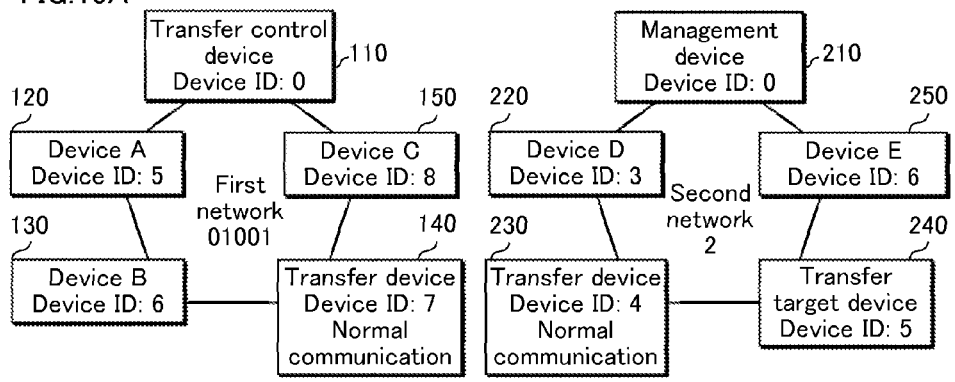
FIGS. 15A, 15B, and 15C are each an overall view showing a status of an address of each device pertaining to Embodiment 1.
Figure 15B:
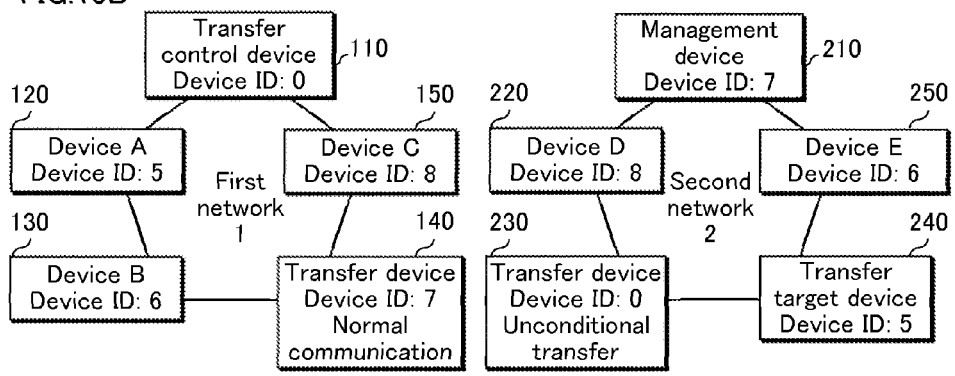
Figure 15C:
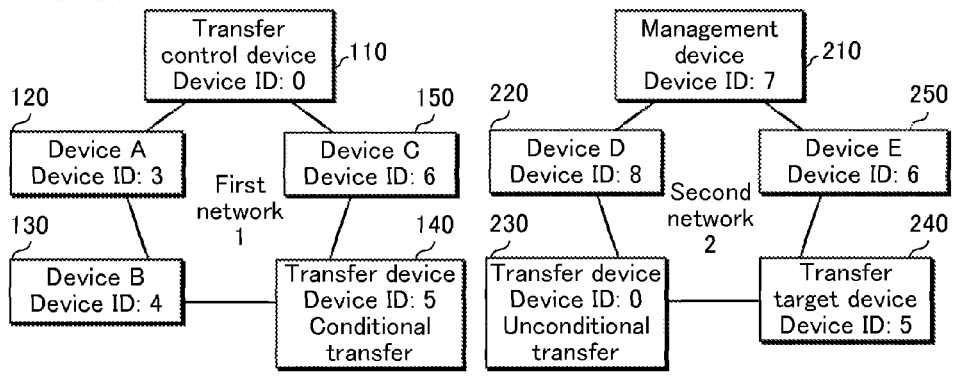
Figure 16:
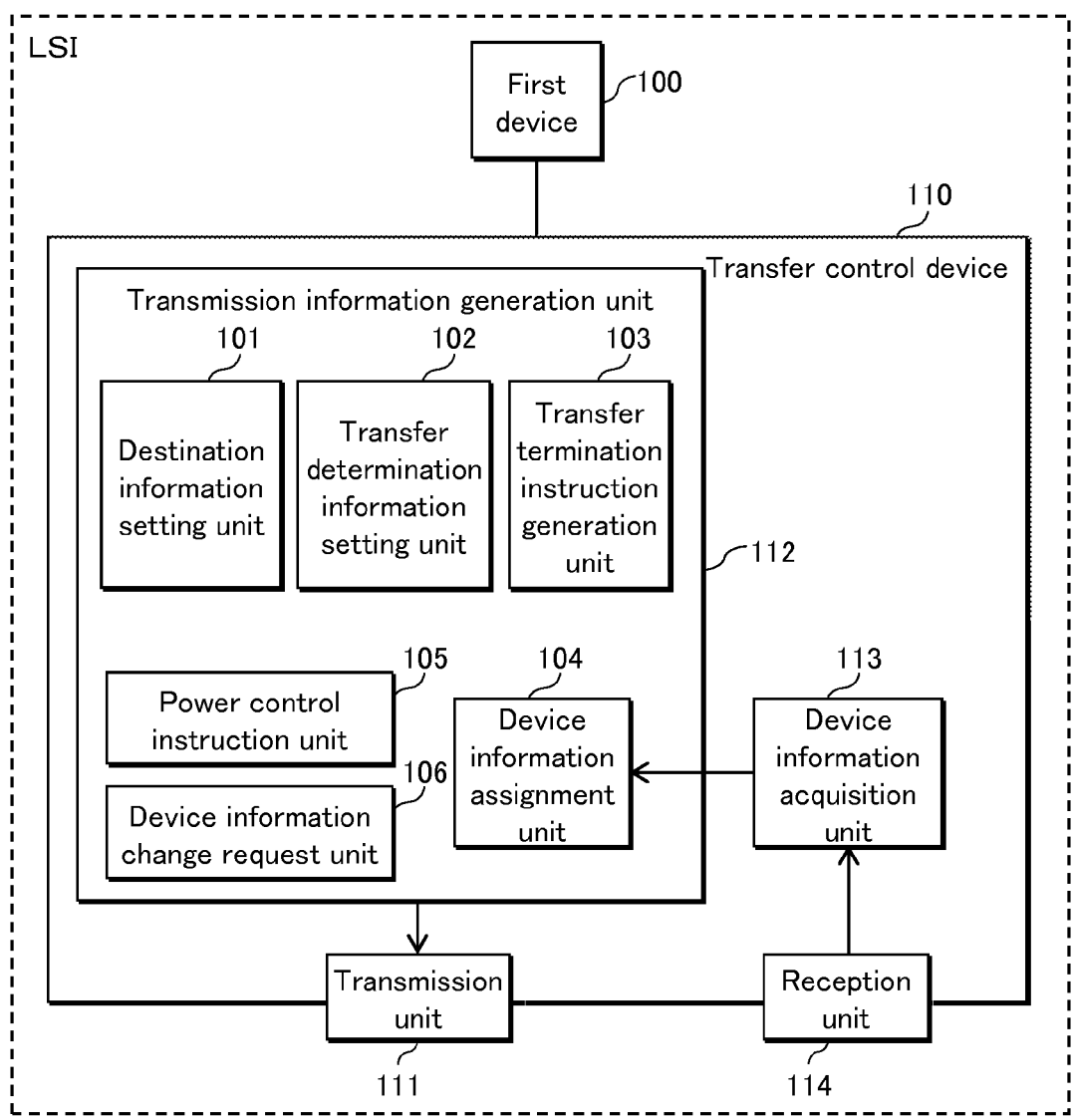
FIG. 16 is a block diagram of the transfer control device pertaining to Embodiments 1 and 2 implemented as an integrated circuit.
Figure 17:
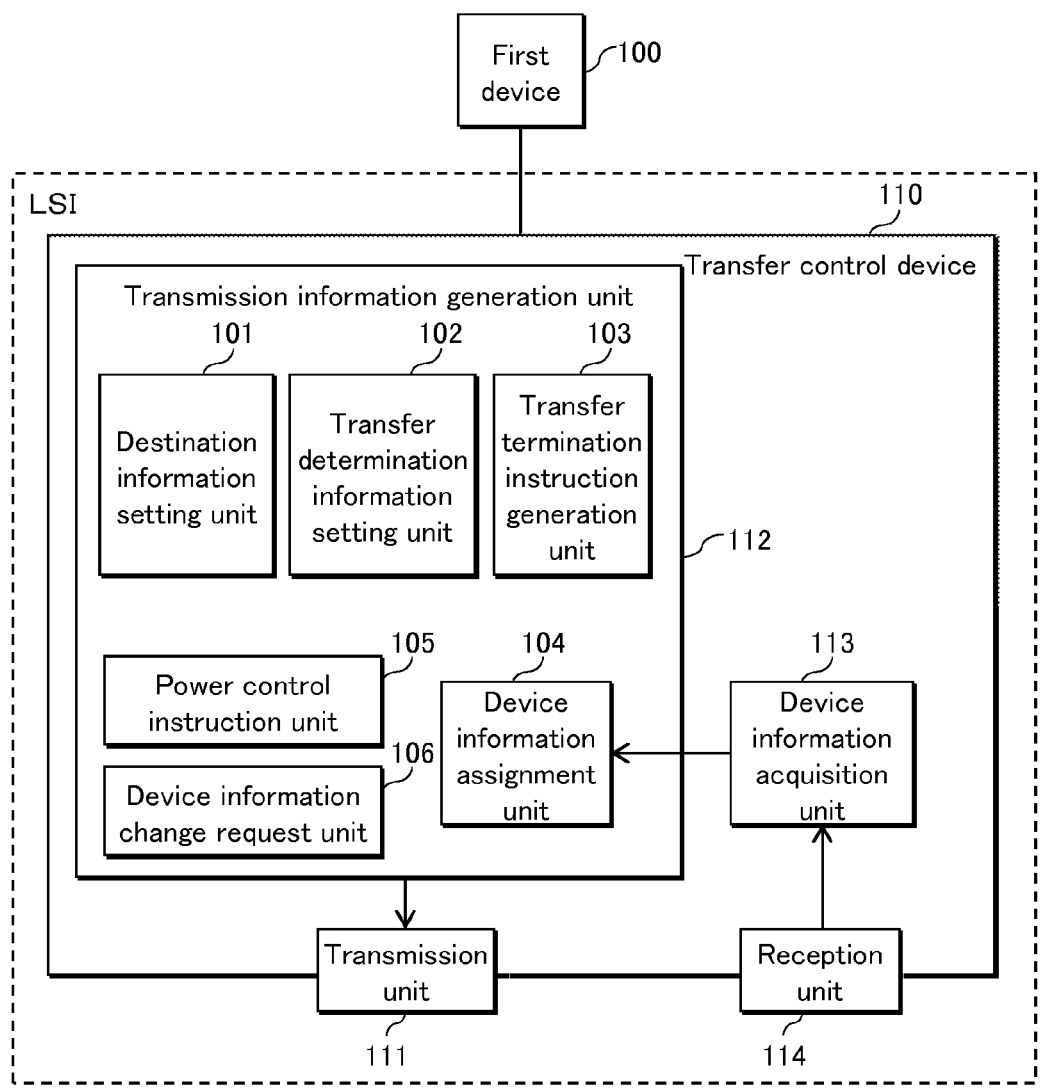
FIG. 17 is a block diagram of the transfer control device pertaining to Embodiments 1 and 2 implemented as a set.
Figure 18:
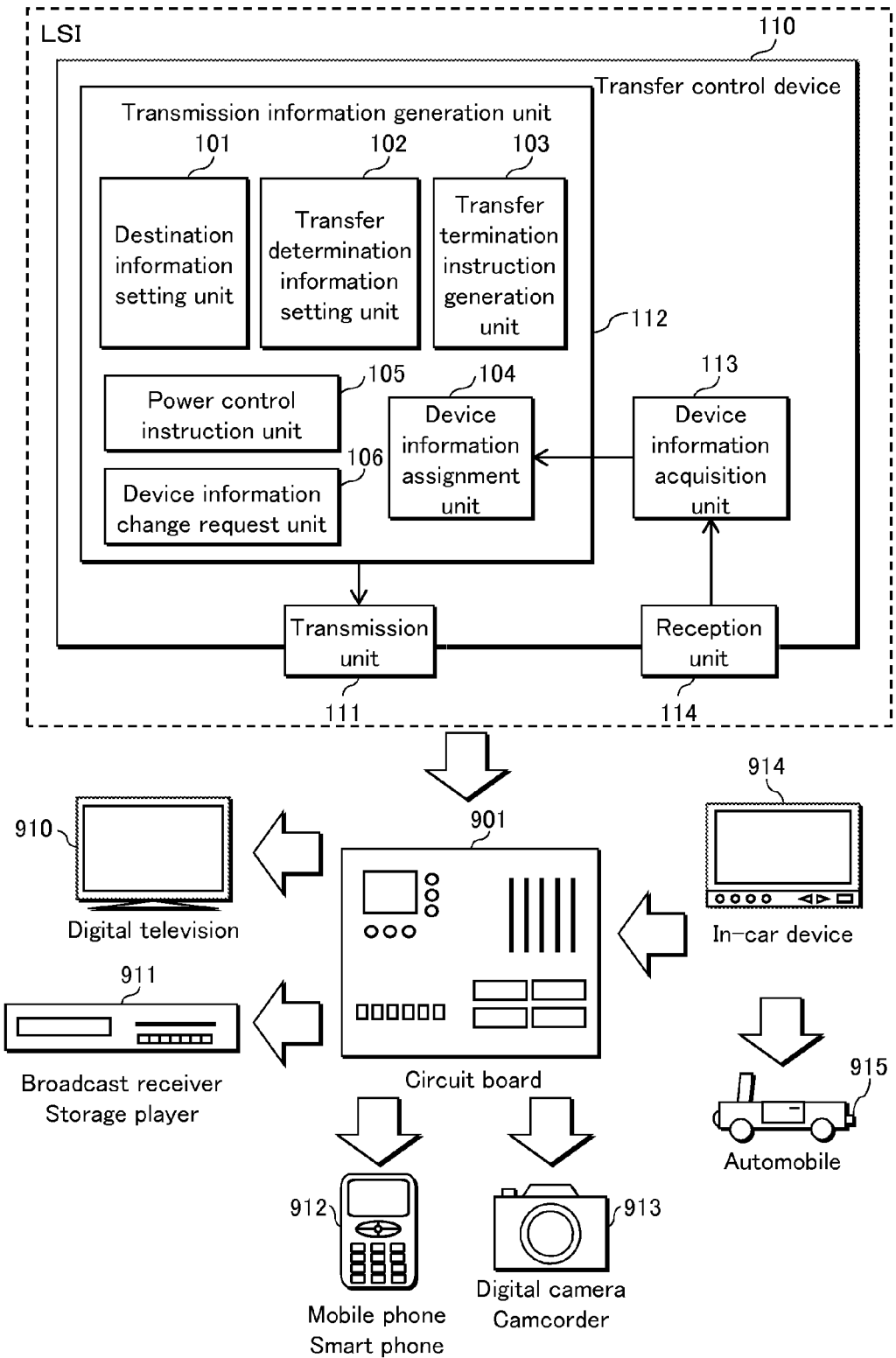
FIG. 18 is a conceptual diagram illustrating examples of application of the transfer control device pertaining to Embodiments 1 and 2 to a set product.

As illustrated in FIG. 15A, some of the addresses of the devices in the first network can overlap with some of the addresses of the devices in the second network. In such a case, when only the address of the transfer device is changed, two devices having the same address can exist within a single network, resulting in a problem of an abnormal operation within the network.

To address the problem, in Embodiment 2, a rule that addresses of adjacent devices are consecutive numbers (with the exception of a device whose address is zero and a device adjacent to the device whose address is zero) is set so that addresses do not overlap each other within a single network. Then, when the addresses are changed, addresses of all devices are changed according to this rule. When the inter-network transfer mode terminates, the management device restores addresses of the devices in the second network to a state before the start of the transfer mode.

Since the transfer control device in Embodiment 2 shares a common configuration with that in Embodiment 1 except for an address of each device and the rule set to change the address, the description of the common configuration regarding the network configuration, each device, and each operation mode is omitted.

<Operations>

(1) Setup of Inter-network Transfer Mode

FIG. 13 shows an inter-network transfer mode setup operation pertaining to Embodiment 2. FIG. 15A shows an address of each device before inter-network transfer mode setup. The following describes the inter-network transfer mode setup operation pertaining to Embodiment 2, based on FIGS. 13, 15A, 15B, and 15C.

The transfer control device 110 generates, as an IP packet, a device information acquisition message for acquiring device information on each device in the second network 2 (S71), and transmits it to the management device 210 (S72). Upon receiving the device information acquisition message, the management device 210 generates, as an IP packet, a message for notifying the transfer control device 110 of the device information on each device in the second network 2 (S73), and transmits it to the transfer control device 110 (S74).

The transfer control device 110 acquires the device information on each device in the second network 2. The transfer control device 110 generates, as an IP packet, a control right transfer request message for transferring, from the management device 210 to the transfer control device 110, a control right to manage device information as successfully acquired (S75). The transfer control device 110 transmits the generated IP packet including the control right transfer request message to the management device 210 (S76). The control right transfer request message includes a request for use of the transfer device 230 as a repeater for transfer between the first network 1 and the second network 2. The control right transfer request message further includes a request for setting an address of the transfer device 230 (=4) to an address having the same value as an address of the transfer control device (=0). The control right transfer request message further includes a request for transition of the management device 210 to a power saving state. The control right transfer request message further includes a request for setting of the communication mode of the transfer device 230 to the unconditional transfer mode.

Upon receiving the control right transfer request message, the management device 210 determines whether the right to control the second network 2 may be transferred to the transfer control device 110 or not (S77). When determining that the right to control the second network 2 may be transferred, the management device 210 generates a message for changing the device information on the transfer device 230 according to the control right transfer request message (S78). The management device 210 then transmits the generated message to the transfer device 230 (S79). The generated message includes an instruction to change the device information on the transfer device 230 (device address=4, communication mode: normal communication mode) according to the control right transfer request message. Specifically, the management device 210 changes the device information on the transfer device 230 (device address=4, communication mode: normal communication mode) to device information (device address=0, communication mode: unconditional transfer mode) according to the control right transfer request message. The transfer device 230 changes its own device information according to the received device information change instruction message (S80). Upon completing the change, the transfer device 230 transmits a device information change completion message to the management device 210 (S81). Similarly, the management device 210 changes its own device address from "0" to "7", and changes the device address of the device D 220 from "3" to "8" according to the above-mentioned rule (S82 and FIG. 15B).

Upon confirming completion of the change of the device information, the management device 210 transmits a control right transfer permission message to the transfer control device 110 (S83), and transitions to the power saving state according to the request for transition to the power saving state (S84).

Upon successfully receiving the control right transfer permission message, the transfer control device 110 sets an address of the transfer device 140 (=7) to an address identical to an address of the transfer target device 240 (=5). The transfer control device 110 further generates a message for setting the communication mode of the transfer device 140 to the conditional transfer mode. The transfer control device 110 further generates messages for changing addresses of the device A 120, the device B 130, and the device C 150 respectively to "3", "4", and "6" according to the above-mentioned rule (S85). The transfer control device 110 transmits four messages thus generated to respective devices (S86). The transfer device 140, the device A 120, the device B 130, and the device C 150 change their own device information pieces according to the received device information change messages (S87). Upon completing the change, the transfer device 140, the device A 120, the device B 130, and the device C 150 transmit device information change completion messages to the transfer control device 110 (S88 and FIG. 15C).

(2) Message Transmission from Transfer Control Device 110 to Transfer Target Device 240 and from Transfer Target Device 240 to Transfer Control Device 110

Since the operations pertaining to Embodiment 2 share a common configuration with those pertaining to Embodiment 1 except for specific values for the addresses of the transfer control device, the transfer target device, and the transfer device (S31 to S37 and S41 to S47), description thereof is omitted.

(3) Termination of Inter-network Transfer Mode

Figure 14:
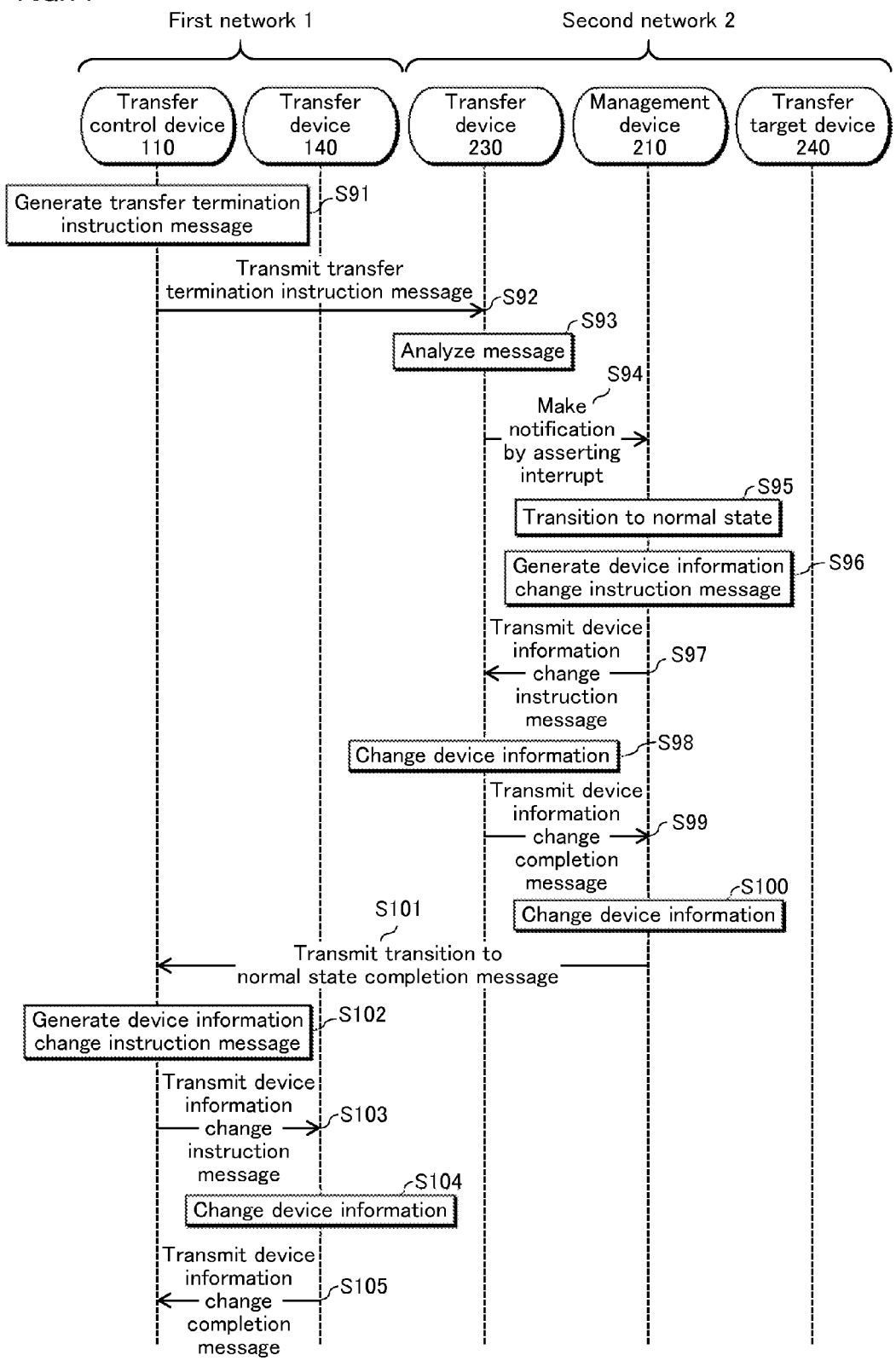
FIG. 14 is a Gantt chart illustrating an inter-network transfer mode termination operation pertaining to Embodiment 2.

FIG. 14 shows an inter-network transfer mode termination operation pertaining to Embodiment 2. The following describes the inter-network transfer mode termination operation pertaining to Embodiment 2, based on FIG. 14.

The transfer control device 110 generates, as an IP packet, a transfer termination instruction message to notify the second network of termination of the inter-network transfer mode (S91), and transmits it to the transfer device 230 (S92). The transfer termination instruction message includes a request for transition of the management device 210 to a normal power state.

Upon receiving the message, the transfer device 230 analyzes the contents of the received message (S93). Upon recognizing that the received message is the transfer period termination instruction message, the transfer device 230 asserts an interrupt to the management device 210 to notify the management device 210 of termination of the transfer period (S94).

Upon receiving the interrupt, the management device 210 checks the contents of the interrupt, and transitions from the power saving state to the normal state (S95). After transitioning to the normal state, the management device 210 generates a message for changing the address of the device D 220 to "3" to restore the second network to a state before the start of the transfer mode. The management device 210 further generates a message for changing the device information on the transfer device 230 to an original state (device address=4, communication mode: normal communication mode) (S96). The management device 210 transmits two messages thus generated to respective devices (S97). The device D 220 and the transfer device 230 change their own device information pieces according to the received device information change message (S98). Upon completing the change, the device D 220 and the transfer device 230 each transmit a device information change completion message to the management device 210 (S99). After changing its own address to "0" (S100), the management device 210 transmits, as an IP packet, a message for notifying the transfer control device 110 of completion of transition to the normal state (S101).

The transfer control device 110 generates a message for restoring the device information on the transfer device 140 to a state before the start of the inter-network transfer mode (device address=7, normal communication mode). The transfer control device 110 further generates messages for changing the addresses of the device A 120, the device B 130, and the device C 150 respectively to "5", "6", and "8" (S102). The transfer control device 110 transmits four messages thus generated to respective devices (S103). The transfer device 140, the device A 120, the device B 130, and the device C 150 change their own device information pieces according to the received device information change messages (S104). Upon completing the change, the transfer device 140, the device A 120, the device B 130, and the device C 150 transmit device information change completion messages to the transfer control device 110 (S105).

Through the series of operations as described above, the first network 1 and the second network 2 are restored to the state before the start of the inter-network transfer mode (FIG. 15A).

<Summary>

According to Embodiments 1 and 2 as set forth above, the first network 1 is a system including the transfer control device 110 and the transfer device 140, and the second network 2 is a system including the management device 210, the transfer device 230 as well as the transfer target device 240.

The transfer control device 110 pertaining to the present invention is configured to include the transfer device 140, the management device 210, the transfer device 230, the transfer target device 240, the transmission unit 111, the transmission information generation unit 112, the destination information setting unit 101, the transfer determination information setting unit 102, the transfer termination instruction generation unit 103, the device information assignment unit 104, the power control instruction unit 105, the device information change request unit 106, the device information acquisition unit 113, and the reception unit 114.

With this configuration, in the present embodiment, the address of the transfer device 140 in the first network 1 is identical to the address of the transfer target device 240 in the second network 2. That is to say, the transfer control device 110 sets the address of the transfer target device 240 as a destination device address to transmit a message to the transfer target device 240. This means that the transfer control device 110 sets, as the destination device address, the address of the transfer device 140 serving as a repeater. As a result, in the present embodiment, there is no need to perform address conversion in the transfer device 140 serving as a repeater between networks, and to set an address of the repeater in addition to the destination device address. With this structure, in the present embodiment, processing pertaining to transfer between networks is simplified, processing load is reduced, and throughput is improved.

Furthermore, in the present embodiment, the address of the transfer control device 110 in the first network 1 is identical to the address of the transfer device 230 in the second network 2. That is to say, the transfer target device 240 sets the address of the transfer control device 110 as a destination device address to transmit a message to the transfer control device 110. This means that the transfer target device 240 sets, as the destination device address, the address of the transfer device 230 serving as a repeater. As a result, in the present embodiment, there is no need to perform address conversion in the transfer device 230 serving as a repeater between networks, and to set an address of the repeater in addition to the destination device address. With this structure, in the present embodiment, processing pertaining to transfer between networks is simplified, processing load is reduced, and throughput is improved.

Furthermore, in the present embodiment, the first network 1 and the second network 2 can use address spaces independently of each other. Compared to a case where an address space is shared between these networks, a larger address space becomes available.

The structure in which a given transfer device is assigned an address identical to an address of the transfer target device allows for flexible applications to a case where a plurality of transfer devices are included in a single network and a case where the transfer device and the transfer control device are connected in various types of topologies.

Furthermore, in the present embodiment, by providing a field of the transfer determination information for each packet header, whether inter-network transfer is possible or not can be set for each packet, leading to more flexible communication.

Furthermore, in the present embodiment, by providing the communication function with the conditional transfer mode and the unconditional transfer mode in addition to the normal communication mode, it is possible to perform appropriate control and management as for whether a device is a device as a target for transfer or a device for inter-network transfer.

Furthermore, in the present embodiment, by providing the unconditional transfer mode, inter-network transfer is efficiently performed even when the transfer target device cannot recognize the field of the transfer determination information.

<Other Modifications Pertaining to Embodiments>

(1) In Embodiments 1 and 2, the transfer control device 110 acquires the device information pieces of all the devices in the second network 2. The present invention, however, is not necessarily limited to such a case. For example, the transfer control device 110 may acquire an address of a device having a desired function by designating the device. In this case, when the designated device is included in the second network, the management device 210 may notify the transfer control device 110 of the device information on the designated device, and, when the designated device is not included in the second network, the management device 210 may notify the transfer control device 110 accordingly. With such a configuration, in the present modification, sufficient message communication is achieved between the transfer control device 110 and the management device 210.

Alternatively, after acquiring the device information pieces on all the devices from the management device 210, the transfer control device 110 may acquire the address of the device having the desired function by designating the device. With such a configuration, in the present modification, the transfer control device 110 can acquire the address of the device in the second network 2 having the desired function in association with the function thereof.

(2) In Embodiments 1 and 2, the management device 210 transitions to the power saving state in response to the request from the power control instruction unit 105 included in the control right transfer permission message. The present invention, however, is not necessarily limited to such a case. For example, the management device 210 may automatically transition to the power saving state after transferring the control right. With such a configuration, in the present modification, the management device 210 can transition to the power saving state without being clearly instructed by the power control instruction unit 105, providing a power saving effect.

(3) In Embodiments 1 and 2, the communication mode of the transfer device 230 is set to the unconditional transfer mode assuming that the transfer target device 240 cannot set the transfer determination information. The present invention, however, is not necessarily limited to such a case. For example, the transfer device 230 may be set to the conditional transfer mode assuming that the transfer target device 240 can set the transfer determination information. With such a configuration, in the present modification, a flexible operation of the transfer device 230 is achieved in the second network.

(4) In Embodiments 1 and 2, termination of the inter-network transfer mode is notified by transmitting a message. The present invention, however, is not necessarily limited to such a case. In Embodiments 1 and 2, for example, a field for notifying the termination may be provided for a packet header. With such a configuration, in the present modification, there is no need to generate a message for notifying termination, leading to a reduction of traffic.

(5) In Embodiments 1 and 2, in order to notify the management device 210 of termination of the inter-network transfer mode, an interrupt is asserted. The present invention, however, is not necessarily limited to such a case. For example, termination of the inter-network transfer mode may be notified to the management device 210 by transmitting a message. With such a configuration, in the present modification, various types of information can be notified to the management device by being included in the message.

(6) In Embodiments 1 and 2, in order to notify the management device 210 of termination of the inter-network transfer mode, an interrupt is asserted. The present invention, however, is not necessarily limited to such a case. For example, termination of the inter-network transfer mode may be notified to the management device 210 by providing a signal line independent of the second network so that the transfer device 230 can notify the management device of the termination. With such a configuration, in the present modification, there is no need for the management device to analyze whether information received via the reception unit 215 in the power saving state is an interrupt or not, providing a more power saving effect.

(7) In Embodiment 1, the device information on the transfer device 230 is changed by the transfer control device 110 when the inter-network transfer mode terminates. The present invention, however, is not necessarily limited to such a case.

For example, the device information on the transfer device 230 may be changed by the management device 210 reassigning the device information pieces on all the devices in the second network 2 after the management device 210 transitions to the normal state. With such a configuration, in the present modification, the management device 210 does not need to store the device information on each device when the management device 210 transitions to the power saving mode, producing a more power saving effect.

(8) In Embodiments 1 and 2, the source device is the transfer control device 110. The present invention, however, is not necessarily limited to such a case. For example, the source device may be a given device in the first network. This configuration is achieved by setting the address of the transfer device 230 to an address identical to an address of the source device in an inter-network transfer setup phase, for example. With such a configuration, in the present modification, an efficient inter-network transfer is achieved between given devices.

(9) In Embodiments 1 and 2, the first network 1 and the second network 2 operate with the same protocol at the data link layer. The present invention, however, is not necessarily limited to such a case. For example, when a protocol pertaining to transfer is a protocol at the network layer, the first network 1 and the second network 2 may operate with the same protocol at the network layer, and operate with different protocols at the data link layer. For example, the first network 1 and the second network 2 may not share exactly the same protocol pertaining to transfer. Alternatively, the first network 1 and the second network 2 may share the same packet format pertaining to transfer, such as an IP packet and a frame, and may not require conversion of an address and a header. With such a configuration, in the present modification, the present invention is applicable to various network configurations.

(10) In Embodiments 1 and 2, each of the first network 1 and the second network 2 has a ring topology. The present invention, however, is not necessarily limited to such a case. For example, at least one of the first network 1 and the second network 2 may have a daisy chain topology or a star topology. With such a configuration, in the present modification, the present invention is applicable to systems and applications assuming various topologies.

(11) In Embodiments 1 and 2, the transfer target device 240 is a storage device. The present invention, however, is not necessarily limited to such a case. For example, the transfer target device 240 may be a communication device, a dual-role device for playing roles of the communication device and the storage device, and a device achieving various other functions. With such a configuration, in the present modification, inter-network transfer is performed between various devices. Especially when the transfer target device 240 and the transfer device 230 support different communication standards, each device in the first network 1 is connectable to a network different from the network between the first network 1 and the second network 2. With such a configuration, in the present modification, the present invention is applicable for example to a mobile router and the like.

(12) In Embodiments 1 and 2, none of the addresses of the devices in the first network 1 is identical to the address of the transfer target device 240. The present invention, however, is not necessarily limited to such a case. Furthermore, when any of the addresses of the devices in the first network 1 overlaps with the address of the transfer target device 240, addresses of all the devices other than the transfer control device are changed. The present invention, however, is not necessarily limited to such a case. For example, when an address of one of the devices in the first network 1 overlaps with the address of the transfer target device 240, the problem of overlapping addresses may be solved by re-assigning the one of the devices an address not used in an address space of the first network 1.

(13) In Embodiments 1 and 2, none of the addresses of the devices in the second network 2 is identical to the address of the transfer control device 110. The present invention, however, is not necessarily limited to such a case. Furthermore, when any of the addresses of the devices in the second network 2 overlaps with the address of the transfer control device 110, addresses of all the devices are changed. The present invention, however, is not necessarily limited to such a case. For example, when an address of one of the devices in the second network 2 overlaps with the address of the transfer control device 110, the problem of overlapping device addresses may be solved by re-assigning the one of the devices an address not used in an address space of the second network 2.

(14) In Embodiments 1 and 2, there is no mention of a case where the device information response message, the control right transfer permission message, the device information change completion message, or the transfer termination response message does not reach its destination. In this case, in the present modification, the device information acquisition message, the control right transfer request message, the device information change instruction message, and the transfer termination instruction message may be transmitted repeatedly until corresponding response messages are received. Alternatively, in the present modification, the corresponding response messages may be transmitted repeatedly a limited number of times.

(15) In Embodiments 1 and 2, the transfer devices 140 and 230 are assigned IP addresses, and some of inter-network messages, such as a device information acquisition message, are transmitted as IP packets. The present invention, however, is not necessarily limited to such a case. For example, some of the inter-network messages may be transmitted as MAC frames in WiGig. In the present modification, for example, the transfer devices 140 and 230 may be assigned addresses on a given communication protocol, and messages may be transmitted with the communication protocol.

(16) In Embodiments 1 and 2, the communication mode of the transfer device 140 is set to the conditional transfer mode. The present invention, however, is not necessarily limited to such a case. For example, in the present modification, the communication mode of the transfer device 140 may be set to the unconditional transfer mode. With such a configuration, in the present modification, a message format not requiring the field of the transfer determination information is defined, thereby achieving more efficient inter-network transfer as a header overhead is reduced.

(17) In Embodiments 1 and 2, the first set 10 is a BD recorder, and the second set 20 is a smart phone. The present invention, however, is not necessarily limited to such a case. For example, each of the first set 10 and the second set 20 may be any device such as a television, a personal computer, a digital camera, a handy camcorder, and a tablet. Furthermore, in Embodiments 1 and 2, one set is not limited to a single device. For example, the devices A and B may be devices separate from the first device.

(18) In Embodiments 1 and 2, the transfer devices 140 and 230 each have an SDIO interface. The present invention, however, is not necessarily limited to such a case. For example, each of the transfer devices 140 and 230 may have any interface such as USB, PCI, PCI Express, SATA, and HDMI.

(19) In Embodiments 1 and 2, the communication standards for the transfer devices 140 and 230 are WiGig. The present invention, however, is not necessarily limited to such a case. The communication standards for the transfer devices 140 and 230 may be any communication standards such as IEEE 802.11a, IEEE 802.11b, IEEE 802.11g, IEEE 802.11n, LTE, and WiMAX.

(20) In Embodiments 1 and 2, the first device 100 and the transfer control device 110 are implemented as a single integrated circuit, and the second device 200 and the management device 210 are implemented as a single integrated circuit. The present invention, however, is not necessarily limited to such a case. For example, the first device 100 and the transfer control device 110 may be implemented as separate integrated circuits, and the second device 200 and the management device 210 may be implemented as separate integrated circuits.

(21) In Embodiments 1 and 2, the device address, the interface version, the device type, and the transfer determination information are information pieces of four, three, five, and one bits, respectively. The present invention, however, is not necessarily limited to such a case. Each of the information pieces may have any bit width.

(22) In Embodiments 1 and 2, the device address, the interface version, and the device type are arranged in this order as subfields of the device information. The present invention, however, is not necessarily limited to such a case. The message header includes the destination device address, the source device address, and the transfer determination information arranged in this order. The present invention, however, is not necessarily limited to such a case. The subfields of the device information and data pieces in the message header may be defined in any order, and may include any other field.

(23) In Embodiments 1 and 2, the transfer control device 110 and the transfer device 140 are separate devices. The present invention, however, is not necessarily limited to such a case. For example, the transfer control device 110 and the transfer device 140 may be implemented as physically the same device. In this case, an address may be assigned for each function, or for each physical device unit.

(24) In Embodiments 1 and 2, the management device 210 and the transfer device 230 are separate devices. The present invention, however, is not necessarily limited to such a case. For example, the management device 210 and the transfer device 230 may be implemented as physically the same device. In this case, an address may be assigned for each function, or for each physical device unit.

(25) In Embodiments 1 and 2, the transfer device 230 and the transfer target device 240 are separate devices. The present invention, however, is not necessarily limited to such a case. For example, the transfer device 230 and the transfer target device 240 may be implemented as physically the same device. In this case, an address may be assigned for each function, or for each physical device unit.

The present invention relates to a data transfer device for achieving efficient data transfer between networks, and allows for a reduced processing load especially pertaining to address conversion and improved transfer throughput. The present invention also allows for effective use of an address space and communication power reduction.

The present invention is therefore effective for integrated circuit products that efficiently access or control a device included in a different network. The present invention is also effective for application to a household electric appliance, a personal computer, a handheld device such as a digital camera and a handy camcorder, and a mobile terminal such as a mobile phone, a smart phone, and a tablet.

REFERENCE SIGNS LIST 1 first network
2 second network
110 transfer control device
140 transfer device
210 management device
230 transfer device
240 transfer target device
111 transmission unit
112 transmission information generation unit
101 destination information setting unit
102 transfer determination information setting unit
103 transfer termination instruction generation unit
104 device information assignment unit
105 power control instruction unit
106 device information change request unit
113 device information acquisition unit
114 reception unit

The invention claimed is:

1. A transfer control device included in a communication system for transferring data via a transfer device in a first network to a transfer target device in a second network, the first and second networks having address spaces independent of each other, the transfer control device comprising:

a non-transitory memory storing a program; and
a hardware processor that executes the program and causes the transfer control device to operate as:
a device information acquisition unit configured to acquire device information on the transfer target device, the device information on the transfer target device including an address of the transfer target device on the second network; and
a device information assignment unit configured to change an address of the transfer device by assigning the transfer device an address identical to the address of the transfer target device,
wherein the transfer device is not included in the second network and includes a single address that does not coincide with addresses of other devices in the first network,
the transfer device operates in one of three modes including an unconditional transfer mode in which the transfer device transfers data packets to the second network regardless of the address of the transfer device and a conditional transfer mode in which the transfer device refrains from transferring, to the second network, any packet that is not addressed to the address of the transfer device, before and after the device information assignment unit changes the address of the transfer device,
the hardware processor executes the program and causes the transfer control device to operate as:
a transmission information generation unit configured to add transfer determination information to a header of a packet to be transmitted to the transfer target device, the transfer determination information indicating whether the packet is to be transferred to the second network or not, and
the transfer device performs transfer to the second network in the conditional transfer mode when a destination device address included in a header of a packet received after the address of the transfer device is changed by the device information assignment unit is identical to the address of the transfer device, and the transfer determination information indicates that the packet is to be transferred to the second network.

2. The transfer control device of claim 1, wherein when changing the address of the transfer device, the device information assignment unit resets addresses of all devices in the first network other than the transfer control device so that each of the reset addresses is unique on the first network.

3. The transfer control device of claim 1, wherein when acquiring the device information on the transfer target device, the device information acquisition unit receives, from the second network, device information on each device in the second network.

4. The transfer control device of claim 3, wherein the device information on each device in the second network includes a device type indicating a function of the device in the second network.

5. The transfer control device of claim 3, wherein the device information acquisition unit asks the second network for the address of the transfer target device by designating a device type of the transfer target device.

6. The transfer control device of claim 5, wherein when a device of the designated device type is not included in the second network, the device information acquisition unit is notified accordingly.

7. The transfer control device of claim 3, wherein the hardware processor that executes the program causes the transfer control device to operate as:
a power control instruction unit configured to instruct the second network to transition to a power saving state after the second network responds to the device information acquisition unit.

8. The transfer control device of claim 7, wherein the power control instruction unit instructs the second network to cancel the power saving state when data transfer between the first and second networks terminates.

9. The transfer control device of claim 1, wherein the transfer device performs transfer to the second network when a destination device address included in a header of a packet received after the address of the transfer device is changed by the device information assignment unit is identical to the address of the transfer device.

10. The transfer control device of claim 1, wherein the hardware processor that executes the program causes the transfer control device to operate as:
a device information change request unit configured to transmit, to the second network, a message requesting a change of an address of a transfer device in the second network to an address identical to an address of the transfer control device as a source device of data transfer.

11. The transfer control device of claim 1, wherein the hardware processor that executes the program causes the transfer control device to operate as:
a transfer termination instruction generation unit configured to generate a transfer termination instruction to be transmitted to the second network to terminate data transfer between the first and second networks.

12. The transfer control device of claim 11, wherein the transfer termination instruction is a 1-bit flag.

13. The transfer control device of claim 11, wherein the transfer termination instruction is a message.

14. The transfer control device of claim 1, wherein the data is transferred from a given device in the first network to the transfer target device.

15. The transfer control device of claim 1, wherein the first network has a ring topology.

16. The transfer control device of claim 1, wherein the first network has a daisy chain topology.

17. The transfer control device of claim 1, wherein the transfer device in the first network is a wireless communication device.

18. The transfer control device of claim 1, wherein the transfer target device is a communication device.

19. The transfer control device of claim 18, wherein the transfer device in the first network and the transfer target device use different communication methods.

20. The transfer control device of claim 1, wherein the transfer target device is a recording medium.

21. The transfer control device of claim 1, wherein the device information acquisition unit acquires the device information on the transfer target device from the second network via the transfer device, by transmitting a packet addressed to the transfer device.

22. An integrated circuit for controlling a communication system for transferring data via a transfer device in a first network to a transfer target device in a second network, the first and second networks having address spaces independent of each other, the integrated circuit comprising:
a device information acquisition circuit that acquires device information on the transfer target device, the device information on the transfer target device including an address of the transfer target device on the second network; and
a device information assignment circuit that changes an address of the transfer device by assigning the transfer device an address identical to the address of the transfer target device,
wherein the transfer device is not included in the second network and includes a single address that does not coincide with addresses of other devices in the first network,
the transfer device operates in one of three modes including an unconditional transfer mode in which the transfer device transfers data packets to the second network regardless of the address of the transfer device and a conditional transfer mode in which the transfer device refrains from transferring, to the second network, any packet that is not addressed to the address of the transfer device, before and after the device information assignment circuit changes the address of the transfer device,
a transmission information generation circuit adds transfer determination information to a header of a packet to be transmitted to the transfer target device, the transfer determination information indicating whether the packet is to be transferred to the second network or not, and
the transfer device performs transfer to the second network in the conditional transfer mode when a destination device address included in a header of a packet received after the address of the transfer device is changed by the device information assignment circuit is identical to the address of the transfer device, and the transfer determination information indicates that the packet is to be transferred to the second network.

23. A transfer control method for a transfer control device of controlling a communication system for transferring data via a transfer device in a first network to a transfer target device in a second network, the transfer control device including a non-transitory memory storing a program and a hardware processor that executes the program to perform the transfer control method, the first and second networks having address spaces independent of each other, the transfer control method comprising:

acquiring device information on the transfer target device, the device information on the transfer target device including an address of the transfer target device on the second network; and changing an address of the transfer device by assigning the transfer device an address identical to the address of the transfer target device, wherein the transfer device is not included in the second network and includes a single address that does not coincide with addresses of other devices in the first network, the transfer device operates in one of three modes including an unconditional transfer mode in which the transfer device transfers data packets to the second network regardless of the address of the transfer device and a conditional transfer mode in which the transfer device refrains from transferring, to the second network, any packet that is not addressed to the address of the transfer device, before and after the address of the transfer device is changed, transfer determination information is added to a header of a packet to be transmitted to the transfer target device, the transfer determination information indicating whether the packet is to be transferred to the second network or not, and the transfer device performs transfer to the second network in the conditional transfer mode when a destination device address included in a header of a packet received after the address of the transfer device is changed is identical to the address of the transfer device, and the transfer determination information indicates that the packet is to be transferred to the second network.

24. A transfer control system including a transfer control device for transferring data via a transfer device in a first network to a transfer target device in a second network, the transfer device having a function to transfer data addressed to the transfer device from the first network to the second network, the first and second networks having address spaces independent of each other, wherein
the transfer control device includes:
a non-transitory memory storing a program; and
a hardware processor that executes the program and causes the transfer control device to operate as:
a device information acquisition unit configured to acquire device information on the transfer target device, the device information on the transfer target device including an address of the transfer target device on the second network; and
a device information assignment unit configured to change an address of the transfer device by assigning the transfer device an address identical to the address of the transfer target device, and the second network includes a second transfer device that communicates one to one with the transfer device, a given device in the first network transmits the data to the transfer target device by using the address of the transfer target device, the transfer device receives data addressed to the transfer target device, and transfers the received data to the second network by transferring the received data to the second transfer device, and the transfer target device receives the data transferred by the transfer device from the second transfer device, wherein the transfer device is not included in the second network and includes a single address that does not coincide with addresses of other devices in the first network, the transfer device operates in one of three modes including an unconditional transfer mode in which the transfer device transfers data packets to the second network regardless of the address of the transfer device and a conditional transfer mode in which the transfer device refrains from transferring, to the second network, any packet that is not addressed to the address of the transfer device, before and after the device information assignment unit changes the address of the transfer device, the hardware processor executes the program and causes the transfer control device to operate as:

a transmission information generation unit configured to add transfer determination information to a header of a packet to be transmitted to the transfer target device, the transfer determination information indicating whether the packet is to be transferred to the second network or not, and the transfer device performs transfer to the second network in the conditional transfer mode when a destination device address included in a header of a packet received after the address of the transfer device is changed by the device information assignment unit is identical to the address of the transfer device, and the transfer determination information indicates that the packet is to be transferred to the second network.

25. The transfer control system of claim 24, wherein
the second network includes a management device configured to manage the second network and respond to an access from the first network to the second network, and
the management device transmits an address of a device on the second network to the device information acquisition unit, and allows a direct transfer between the transfer target device and the second transfer device without passing through the management device by transferring a control right of the second network to the transfer control device.

* * * * *